(12) United States Patent
Mori

(10) Patent No.: US 9,678,312 B2
(45) Date of Patent: Jun. 13, 2017

(54) IMAGING LENS AND IMAGING APPARATUS

(71) Applicant: FUJIFILM Corporation, Tokyo (JP)

(72) Inventor: Masao Mori, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/136,393

(22) Filed: Apr. 22, 2016

(65) Prior Publication Data

US 2016/0320590 A1 Nov. 3, 2016

(30) Foreign Application Priority Data

Apr. 30, 2015 (JP) ................................. 2015-092550

(51) Int. Cl.
*G02B 9/64* (2006.01)
*G02B 13/00* (2006.01)
*G02B 13/06* (2006.01)

(52) U.S. Cl.
CPC ......... *G02B 13/0045* (2013.01); *G02B 13/06* (2013.01)

(58) Field of Classification Search
CPC .... G02B 13/0045; G02B 13/06; G02B 13/02; G02B 23/04; G02B 13/12
USPC ....................................................... 359/755
See application file for complete search history.

(56) References Cited

U.S. PATENT DOCUMENTS

| 3,994,574 | A | * | 11/1976 | Nakagawa | ............... | G02B 9/64 |
| | | | | | | 359/755 |
| 9,182,570 | B2 | * | 11/2015 | Heu | ........................ | G02B 13/06 |
| 9,341,825 | B2 | * | 5/2016 | Arimoto | ................ | G02B 13/04 |

FOREIGN PATENT DOCUMENTS

JP         2010-091697 A        4/2010

\* cited by examiner

*Primary Examiner* — Bumsuk Won
*Assistant Examiner* — Grant Gagnon
(74) *Attorney, Agent, or Firm* — Studebaker & Brackett PC

(57) ABSTRACT

An imaging lens includes, in order from the object side to the image side: a negative first lens; a positive second lens; a positive third lens; a negative fourth lens; a positive fifth lens; a positive sixth lens; and a negative seventh lens. In the imaging lens, Conditional Formula (1) related to the radius of curvature R2 of the surface of the first lens toward the image side and the focal length f of the entire lens system and Conditional Formula (2) related to the radius of curvature R3 of the surface of the second lens toward the object side and the focal length f of the entire lens system are satisfied.

$$1 < R2/f \qquad (1)$$

$$4 < R3/f < 30 \qquad (2).$$

16 Claims, 19 Drawing Sheets

FIG.1
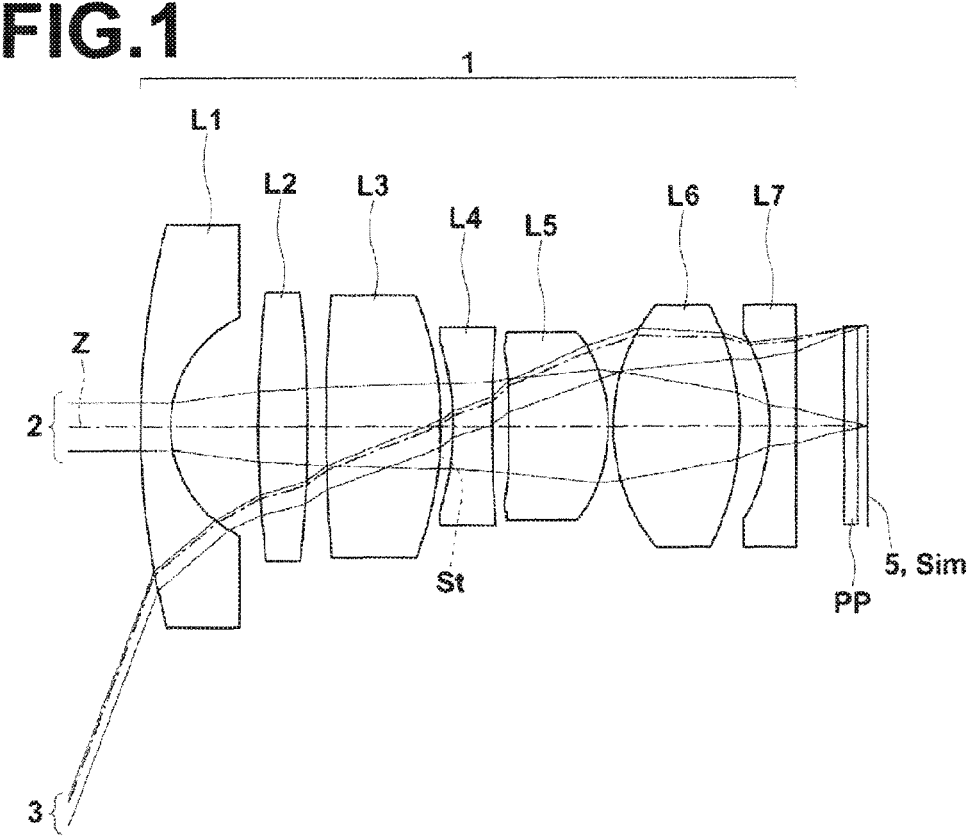
FIG.2  EXAMPLE 1
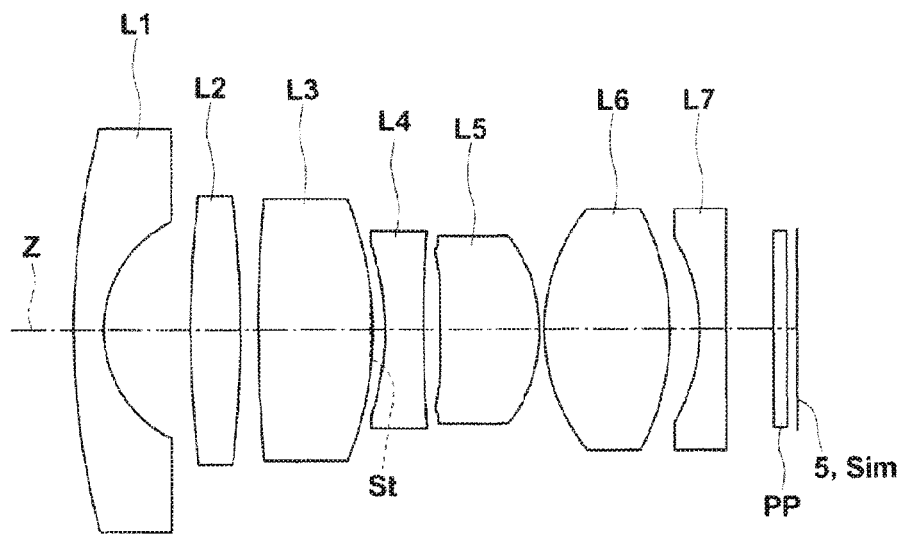

FIG.3    EXAMPLE 2
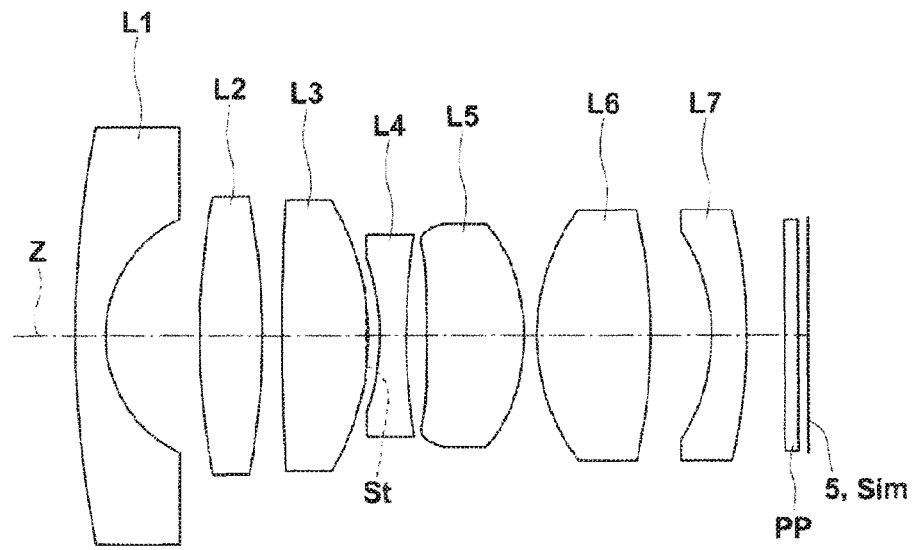
FIG.4    EXAMPLE 3
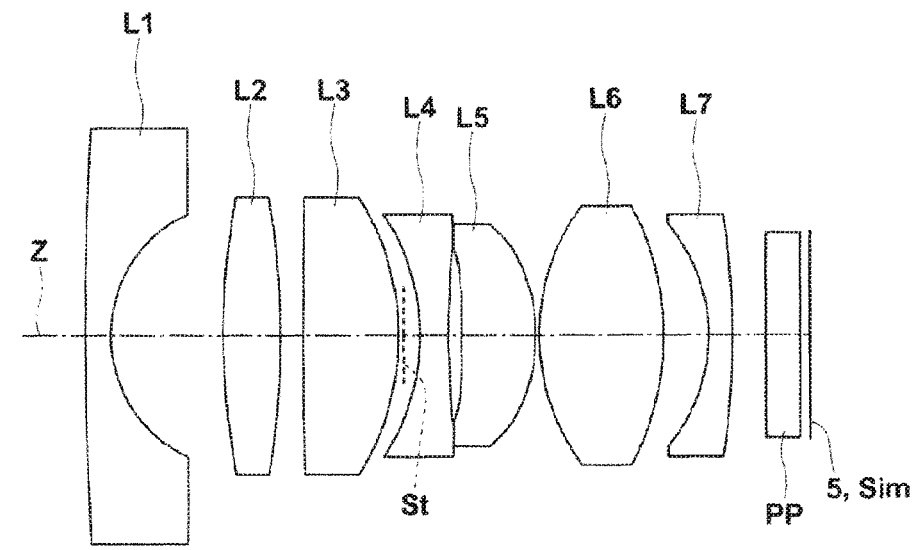

FIG.5  EXAMPLE 4
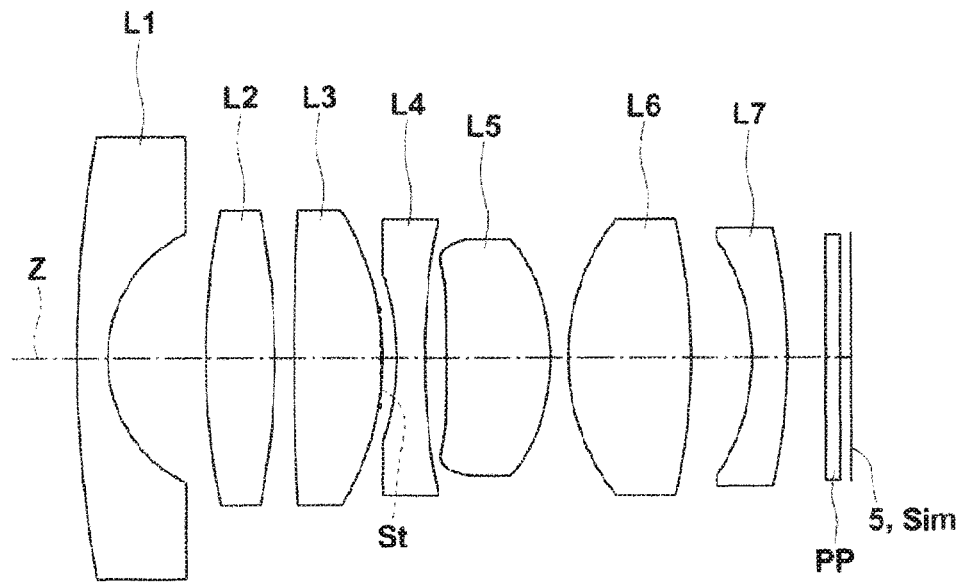
FIG.6  EXAMPLE 5
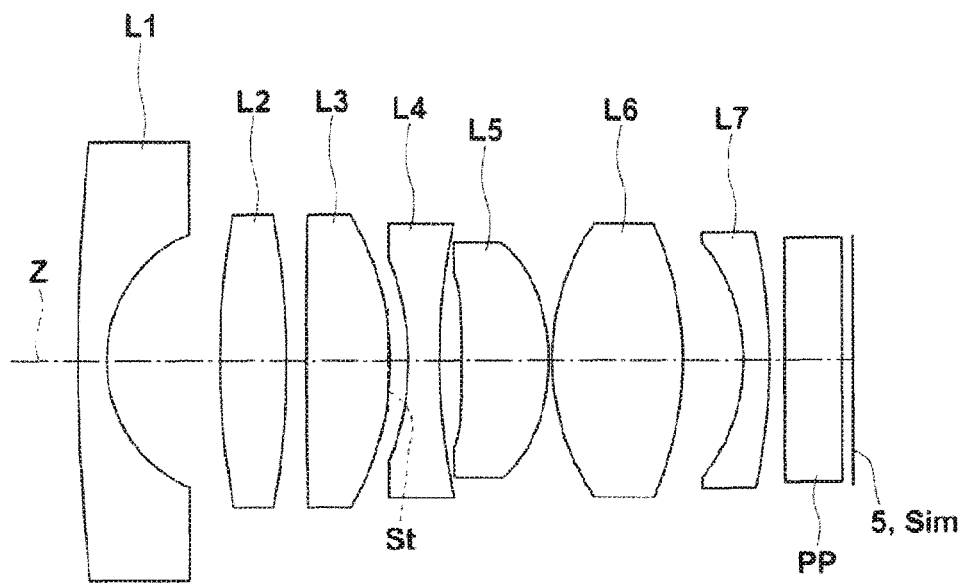

FIG.7  EXAMPLE 6
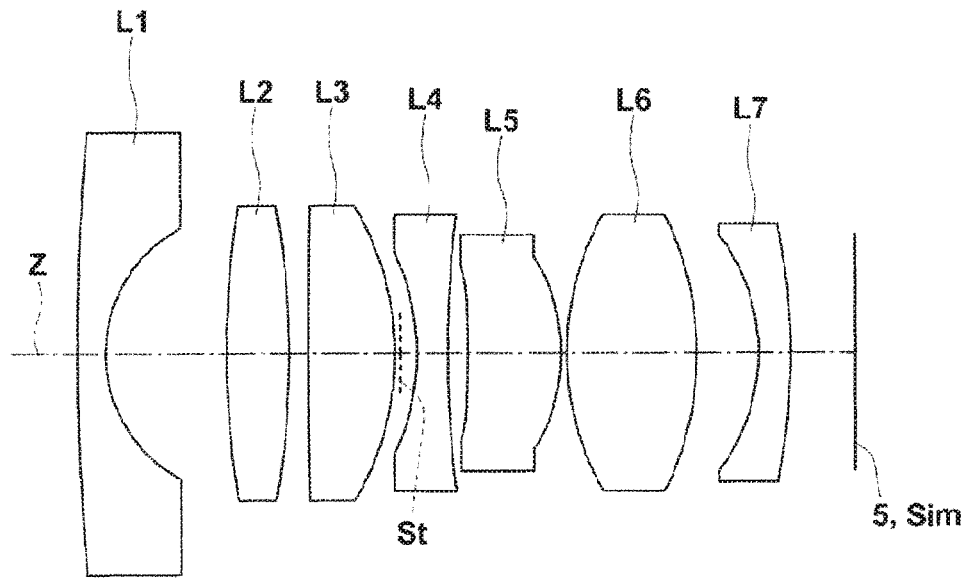
FIG.8  EXAMPLE 7
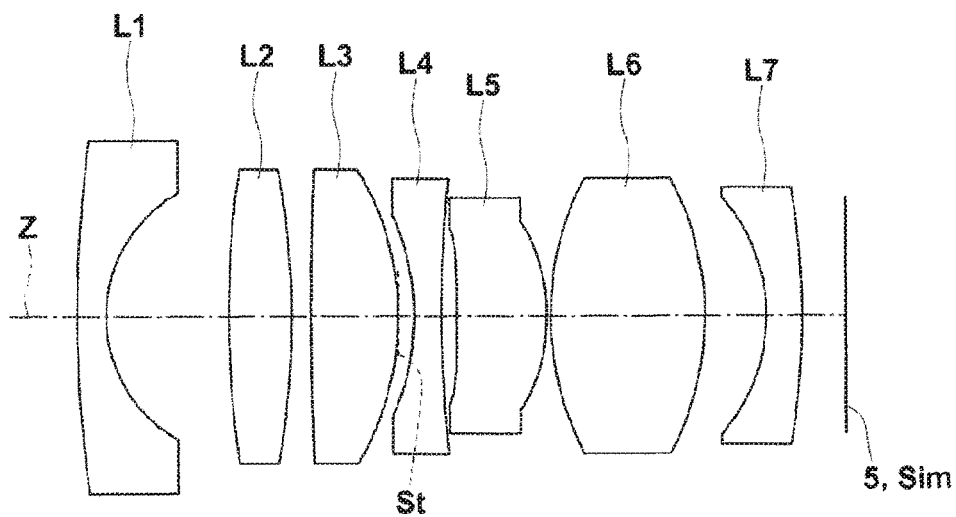

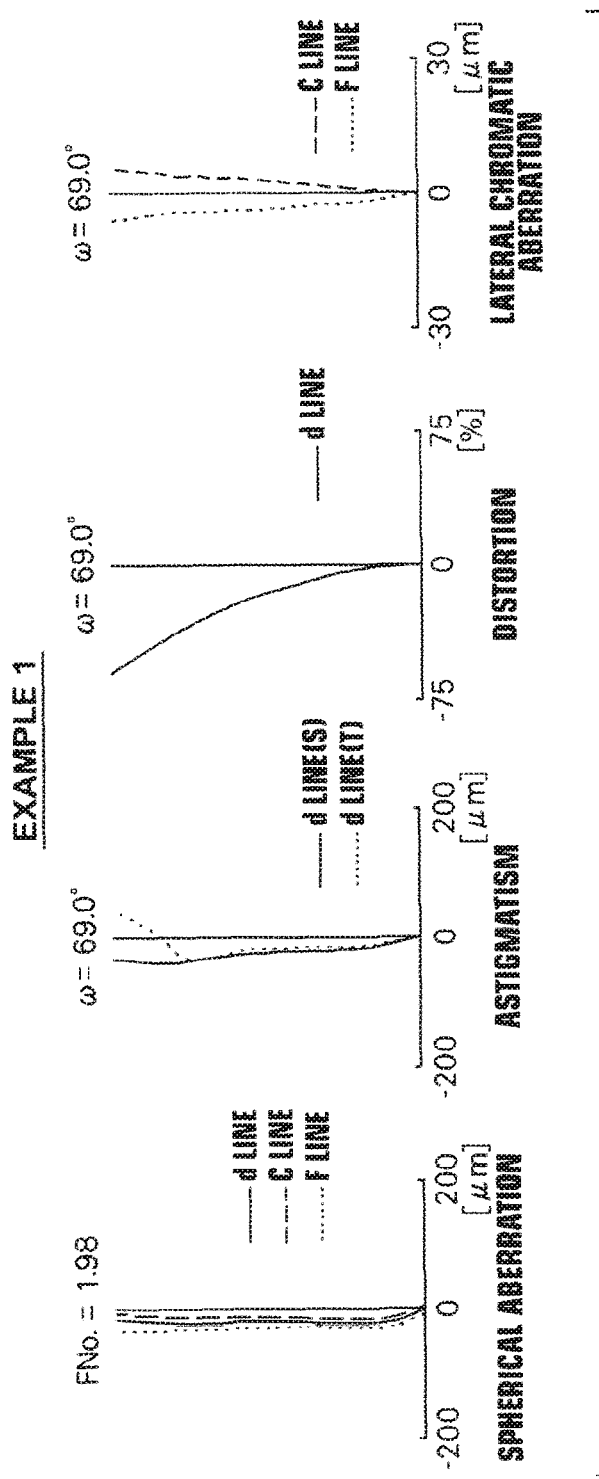

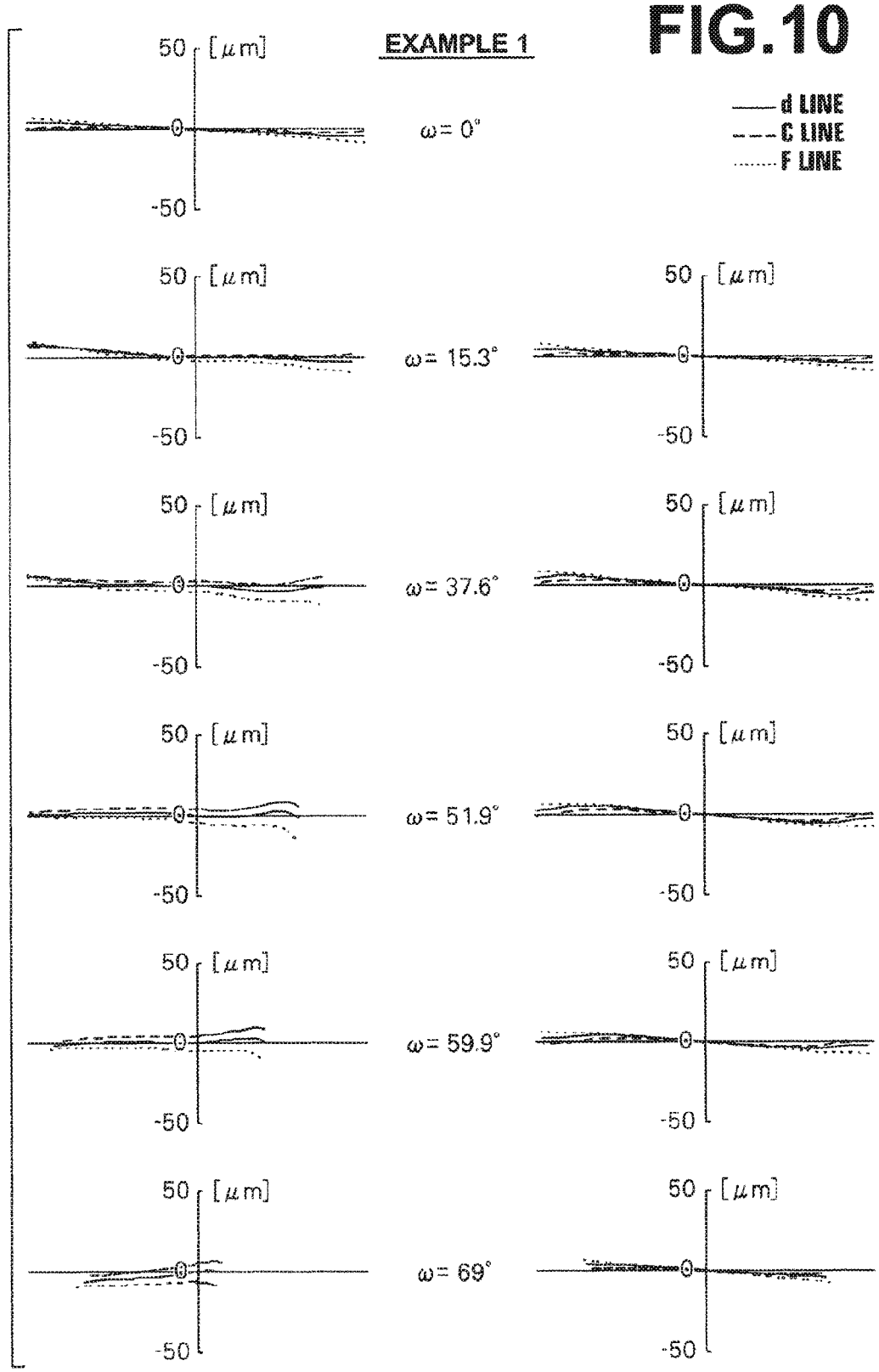

FIG.17 EXAMPLE 5

IMAGING LENS AND IMAGING APPARATUS

CROSS REFERENCE TO RELATED APPLICATIONS

The present application claims priority under 35 U.S.C. §119 to Japanese Patent Application No. 2015-092550 filed on Apr. 30, 2015. The above application is hereby expressly incorporated by reference, in its entirety, into the present application.

BACKGROUND

The present disclosure is related to an imaging lens and an imaging apparatus. More specifically, the present disclosure is related to an imaging lens which can be favorably utilized in a vehicle mounted camera, a surveillance camera, a camera for a portable terminal, and the like, and to an imaging apparatus equipped with this imaging lens.

Cameras in the aforementioned fields are generally utilized by combining an imaging element such as a CCD (Charge Coupled Device) or a CMOS (Complementary Metal Oxide Semiconductor) and an imaging lens. Recently, miniaturization of and increase in the number of pixels in imaging elements such as CCD's and CMOS's is progressing at an extremely high rate. As a result miniaturization and improved performance is in demand for imaging lenses to be combined therewith.

Meanwhile, it is desired for imaging lenses for use in cameras in the aforementioned fields to have high weather resistance properties, to be utilizable in a wide temperature range from outdoors in cold weather climates to inside vehicles during the summer in tropical climates, to have compact configurations, and to have favorable performance. Imaging lenses having small F numbers are particularly desired for use in vehicle mounted cameras and surveillance cameras, such that these cameras will be utilizable during nighttime.

Japanese Unexamined Patent Publication No. 2010-091697 discloses an imaging lens, which is utilizable in a vehicle mounted camera, having a six lens configuration in which a negative lens, a positive lens, a positive lens, a negative lens, a positive lens, and a positive lens are provided in this order from the object side to the image side.

SUMMARY

In addition to the above demands, it is desired for images to be obtained with wide angles view by vehicle mounted cameras, surveillance cameras, and the like. Recently, a wider angle of view than that provided by the imaging lens disclosed in Japanese Unexamined Patent Publication No. 2010-091697 is desired. In addition, demands with respect to imaging lenses are progressively becoming more stringent. Particularly, it is desired for aberrations to be favorably corrected and for imaging lenses to have higher resolution, accompanying the increase in the numbers of pixels in imaging elements.

The present disclosure has been developed in view of the foregoing circumstances. The present disclosure provides an imaging lens having a wide angle of view, in which aberrations are favorably corrected, and which has high optical performance. The present disclosure also provides an imaging apparatus equipped with this imaging lens.

The imaging lens of the present disclosure consists of seven lenses, which are, in order from the object side to the image side:
a first lens having a negative refractive power;
a second lens having a positive refractive power;
a third lens having a positive refractive power;
a fourth lens having a negative refractive power;
a fifth lens having a positive refractive power;
a sixth lens having a positive refractive power; and
a seventh lens having a negative refractive power; and
Conditional Formulae (1) and (2) below are satisfied:

$$1 < R2/f \tag{1}$$

$$4 < R3/f < 30 \tag{2}$$

wherein R2 is the radius of curvature of the surface of the first lens toward the image side, f is the focal length of the entire lens system, and R3 is the radius of curvature of the surface of the second lens toward the object side.

In the imaging lens of the present disclosure, it is preferable for at least one of Conditional Formulae (3) through (9), (1-1), (2-1), (3-1), (3-2), (5-1), and (7-1) below to be satisfied. Note that a preferred aspect may be that in which any one of Conditional Formulae (3) through (9), (1-1), (2-1), (3-1), (3-2), (5-1), and (7-1) below is satisfied, or may be that in which an arbitrary combination of the conditional formulae is satisfied.

$$1 < R2/f < 3 \tag{1-1}$$

$$4 < R3/f < 15 \tag{2-1}$$

$$D4/f < 0.39 \tag{3}$$

$$0.1 < D4/f < 0.39 \tag{3-1}$$

$$0.15 < D4/f < 0.39 \tag{3-2}$$

$$-2 < f1/f < -1.5 \tag{4}$$

$$2.5 < f2/f \tag{5}$$

$$3 < f2/f < 7 \tag{5-1}$$

$$1.5 < f23/f < 3 \tag{6}$$

$$-1 < f1/f23 < -0.4 \tag{7}$$

$$-1 < f1/f23 < -0.6 \tag{7-1}$$

$$2.5 < f3/f < 4.5 \tag{8}$$

$$1 < f2/f3 < 1.55 \tag{9}$$

wherein R2 is the radius of curvature of the surface of the first lens toward the image side, f is the focal length of the entire lens system, R3 is the radius of curvature of the surface of the second lens toward the object side, D4 is the distance along the optical axis between the second lens and the third lens, f1 is the focal length of the first lens, f2 is the focal length of the second lens, f23 is the combined focal length of the second lens and the third lens, and f3 is the focal length of the third lens.

In the imaging lens of the present disclosure, it is preferable for an aperture stop to be positioned between the surface of the third lens toward the object side and the surface of the fourth lens toward the object side.

Note that the expression "consists of" above refers to essential elements, and means that the imaging lens of the present disclosure may also include lenses that practically have no power, optical elements other than lenses such as a stop, a cover glass, and filters, and mechanical components such as lens flanges, a lens barrel, a camera shake correcting mechanism, etc., in addition to the constituent elements listed above.

Note that the signs of the refractive powers and the radii of curvature of lenses in the zoom lens of the present disclosure will be considered in the paraxial region for lenses that include aspherical surfaces. In addition, the signs of the radii of curvature are positive for surface shapes which are convex toward the object side, and negative for surface shapes which are convex toward the image side.

An imaging apparatus of the present disclosure is equipped with the imaging lens of the present disclosure.

According to the present disclosure, the power arrangement is favorably set in a lens system having a seven lens configuration, and predetermined conditional formulae are satisfied. Therefore, a wide angle imaging lens, in which aberrations are favorably corrected, and which has high optical performance, as well as an imaging apparatus equipped with this imaging lens, can be provided.

BRIEF DESCRIPTION OF THE DRAWINGS

FIG. 1 is a cross sectional diagram that illustrates the configuration of an imaging lens according to an embodiment of the present disclosure and the paths of light beams that pass through the imaging lens.

FIG. 2 is a cross sectional diagram that illustrates the lens configuration of an imaging lens according to Example 1 of the present disclosure.

FIG. 3 is a cross sectional diagram that illustrates the lens configuration of an imaging lens according to Example 2 of the present disclosure.

FIG. 4 is a cross sectional diagram that illustrates the lens configuration of an imaging lens according to Example 3 of the present disclosure.

FIG. 5 is a cross sectional diagram that illustrates the lens configuration of an imaging lens according to Example 4 of the present disclosure.

FIG. 6 is a cross sectional diagram that illustrates the lens configuration of an imaging lens according to Example 5 of the present disclosure.

FIG. 7 is a cross sectional diagram that illustrates the lens configuration of an imaging lens according to Example 6 of the present disclosure.

FIG. 8 is a cross sectional diagram that illustrates the lens configuration of an imaging lens according to Example 7 of the present disclosure.

FIG. 9 is a collection of diagrams that illustrate various aberrations of the imaging lens of Example 1, which are spherical aberration, astigmatism, distortion, and lateral chromatic aberration in this order from the left side of the drawing sheet.

FIG. 10 is a collection of diagrams that illustrate lateral aberrations of the imaging lens of Example 1.

DESCRIPTION OF THE EMBODIMENTS

Figure 11:
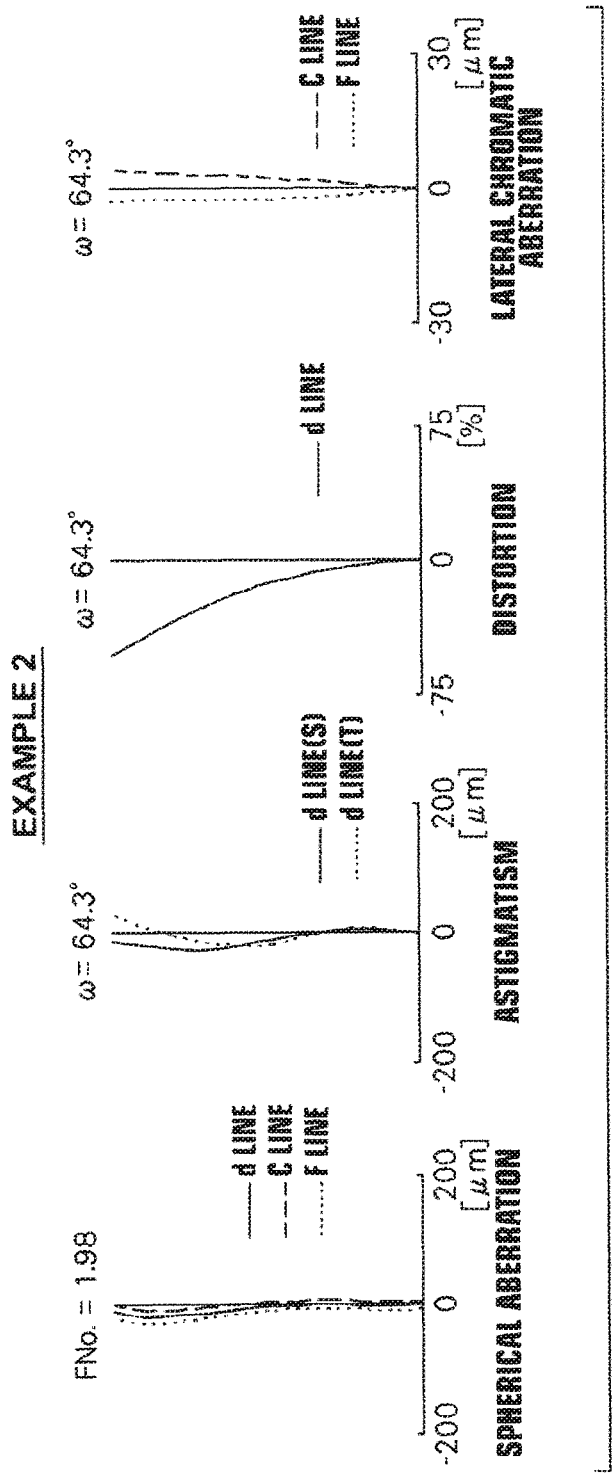
FIG. 11 is a collection of diagrams that illustrate various aberrations of the imaging lens of Example 2, which are spherical aberration, astigmatism, distortion, and lateral chromatic aberration in this order from the left side of the drawing sheet.

Hereinafter, embodiments of the present disclosure will be described in detail with reference to the attached drawings. FIG. 1 is a cross sectional diagram that illustrates the lens configuration and the optical paths of light beams through an imaging lens 1 according to an embodiment of the present disclosure. The example of the configuration illustrated in FIG. 1 corresponds to the configuration of an imaging lens of Example 1 to be described later. In FIG. 1, the left side is the object side, and the right side is the image side. The optical paths are illustrated for an axial light beam 2 and an off axis light beam 3 at a maximum angle of view.

FIG. 1 also illustrates an imaging element 5 provided at an image formation plane Sim of the imaging lens 1, taking a case in which the imaging lens 1 is applied to an imaging apparatus into consideration. The imaging element 5 converts optical images formed by the imaging lens 1 into electrical signals. An imaging element such as a CCD (Charge Coupled Device) and a CMOS (Complementary Metal Oxide Semiconductor) may be employed as the imaging element 5.

When the imaging lens 1 is applied to an imaging apparatus, a cover glass, a prism, and various filters, such as an infrared cutoff filter and a low pass filter, may be provided between the lens system and the image formation plane Sim, depending on the configuration of the imaging apparatus. Therefore, FIG. 1 illustrates an example in which a plane parallel plate shaped optical member PP that presumes such components is provided between the lens system and the image formation plane Sim. However, the position of the optical member PP is not limited to that illustrated in FIG. 1, and a configuration from which the optical member PP is omitted is also possible.

The imaging lens 1 consists of seven lenses, which are, in order from the object side to the image side: a first lens L1 having a negative refractive power; a second lens L2 having a positive refractive power; a third lens L3 having a positive refractive power; a fourth lens L4 having a negative refractive power; a fifth lens L5 having a positive refractive power; a sixth lens L6 having a positive refractive power; and a seventh lens L7 having a negative refractive power.

By configuring the first lens L1, which is provided most toward the object side, as a negative lens, a widening of the angle of view of the lens system becomes possible, and securing back focus is facilitated. In addition, by configuring the second lens L2, the third lens L3, the fifth lens L5, and the sixth lens L6 to be positive lenses, four positive lenses constitute the portions of the lens system that impart positive refractive power. This configuration facilitates correction of spherical aberration and astigmatism.

In addition, the imaging lens 1 is configured such that Conditional Formulae (1) and (2) below are satisfied.

$$1<R2/f \tag{1}$$

$$4<R3/f<30 \tag{2}$$

wherein R2 is the radius of curvature of the surface of the first lens toward the image side, f is the focal length of the entire lens system, and R3 is the radius of curvature of the surface of the second lens toward the object side.

Conditional Formula (1) is a conditional formula for realizing favorable correction of aberrations in the case that the angle of view is widened. By configuring the imaging lens such that the value of R2/f is not less than or equal to the lower limit defined in Conditional Formula (1), the surface of the first lens L1 toward the image side can be formed to be concave while the radius of curvature thereof can be prevented from becoming excessively small. As a result, off axis aberrations, and particularly higher order comatic aberration caused by rays of light that enter the peripheral portions of an imaging region (hereinafter, referred to as "peripheral light rays"), can be suppressed, and obtaining favorable resolution properties is facilitated. Further, it is preferable for Conditional Formula (1-1) below to be satisfied. By configuring the imaging lens such that the value of R2/f is not greater than or equal to the upper limit defined in Conditional Formula (1-1), the degrees by which light beams can be divided according to angles of view in the second lens L2 and lenses positioned at the image side of the second lens L2 can be increased. As a result, favorably correcting aberrations according to angles of view is facilitated.

$$1<R2/f<3 \tag{1-1}$$

Conditional Formula (2) is also a conditional formula for realizing favorable correction of aberrations in the case that the angle of view is widened. By configuring the imaging lens such that the value of R3/f is not less than or equal to the lower limit defined in Conditional Formula (2), the surface of the second lens L2 toward the object side can be formed to be convex while the radius of curvature thereof can be prevented from becoming excessively small. Thereby, the degrees by which light beams can be divided according to angles of view in the second lens L2 and lenses positioned at the image side of the second lens L2 can be increased. As a result, favorably correcting aberrations according to angles of view is facilitated. In addition, by configuring the imaging lens such that the value of R3/f is not greater than or equal to the upper limit defined in Conditional Formula (2), the angles formed by a line normal to the surface of the second lens L2 toward the object side at the intersections between the peripheral light rays and the surface of the second lens L2 toward the object side and the peripheral light rays can be prevented from becoming excessively large. Thereby, off axis aberrations can be suppressed. Negative comatic aberration will be generated at the surface of the first lens L1 toward the image side by light beams that enter the peripheral portions of an imaging region (hereinafter, referred to as "peripheral light beams") at the lower side. However, by configuring the imaging lens such that the value of R3/f is not greater than or equal to the upper limit defined in Conditional Formula (2), an increase in the negative comatic aberration can be suppressed, and favorable correction of aberrations will be facilitated. It is preferable for Conditional Formula (2-1) below to be satisfied, in order to obtain the above advantageous effects related to the lower limit of Conditional Formula (2) while causing the above advantageous effects related to the upper limit of Conditional Formula (2) to become more prominent.

$$4<R3/f<15 \tag{2-1}$$

Further, it is preferable for at least one of Conditional Formulae (3) through (9) below to be satisfied in the imaging lens 1. Note that a preferred aspect may be that in which any one of Conditional Formulae (3) through (9) below is satisfied, or may be that in which an arbitrary combination of the conditional formulae is satisfied.

$$D4/f<0.39 \tag{3}$$

$$-2<f1/f<-1.5 \tag{4}$$

$$2.5<f2/f \tag{5}$$

$$1.5\ 21\ f23/f<3 \tag{6}$$

$$-1<f1/f23<-0.4 \tag{7}$$

$$2.5<f3/f<4.5 \tag{8}$$

$$1<f2/f3<1.55 \tag{9}$$

wherein f is the focal length of the entire lens system, D4 is the distance along the optical axis between the second lens and the third lens, f1 is the focal length of the first lens, f2 is the focal length of the second lens, f23 is the combined focal length of the second lens and the third lens, and f3 is the focal length of the third lens.

Conditional Formula (3) is a conditional formula related to miniaturization of the lens system and correction of aberrations caused by light rays at the lower side of light beams. Configuring the imaging lens such that the value of D4/f is not greater than or equal to the upper limit defined in Conditional Formula (3) is advantageous from the viewpoint of miniaturization of the lens system. Note that in the imaging lens 1, negative comatic aberration which is generated at the surface of the first lens L1 toward the image side by lower light rays of peripheral light beams is corrected by the surface of the second lens L2 toward the image side. By configuring the imaging lens such that the value of D4/f is not greater than or equal to the upper limit defined in Conditional Formula (3), the negative comatic aberration becoming excessively corrected by the surface of the second lens L2 toward the image side can be prevented. Further, it is preferable for Conditional Formula (3-1) below to be satisfied.

$$0.1<D4/f<0.39 \tag{3-1}$$

By configuring the imaging lens such that the value of D4/f is not less than or equal to the lower limit defined in Conditional Formula (3-1), it becomes possible to favorably correct negative comatic aberration which is generated at the surface of the first lens L1 toward the image side. It is more preferable for Conditional Formula (3-2) below to be satisfied, in order to obtain the above advantageous effects related to the upper limit of Conditional Formula (3) while causing the above advantageous effects related to the lower limit of Conditional Formula (3-1) to become more prominent.

$$0.15<D4/f<0.39 \tag{3-2}$$

Conditional Formula (4) is mainly related to widening the angle of view. Configuring the imaging lens such that the value of f1/f is not less than or equal to the lower limit defined in Conditional Formula (4) is advantageous from the viewpoint of widening the angle of view. By configuring the imaging lens such that the value of f1/f is not greater than or equal to the upper limit defined in Conditional Formula (4), the generation of high order aberrations related to peripheral light rays can be suppressed, and it will become possible to obtain favorable performance.

Conditional Formula (5) is a conditional formula that regulates the refractive power of the second lens L2 and enables aberrations to be favorably corrected. By configuring the imaging lens such that the value of f2/f is not less than or equal to the lower limit defined in Conditional Formula (5), positive comatic aberration which is generated at the surface of the second lens L2 toward the image side by lower light rays of peripheral light beams can be suppressed, and favorable correction of aberrations will become possible. Further, it is preferable for Conditional Formula (5-1) below to be satisfied.

$$3<f2/f<7 \tag{5-1}$$

The advantageous effects described above related to Conditional Formula (5) will become more prominent, by configuring the imaging lens such that the value of f2/f is not less than or equal to the lower limit defined in Conditional Formula (5-1). In addition, by configuring the imaging lens such that the value of f2/f is not greater than or equal to the upper limit defined in Conditional Formula (5-1), the refractive power of the second lens L2 can be suppressed to be within an appropriate range, and negative comatic aberration which is generated at the first lens L1 can be favorably corrected.

Conditional Formula (6) is a conditional formula for setting the combined refractive power of the second lens L2 and the third lens L3 appropriately, and for enabling spherical aberration to be favorably corrected. By configuring the imaging lens such that the value of f23/f is not less than or equal to the lower limit defined in Conditional Formula (6), the combined positive refractive power of the second lens L2 and the third lens L3 can be prevented from becoming excessively strong, and excessive generation of negative spherical aberration can be suppressed. By configuring the imaging lens such that the value of f23/f is not greater than or equal to the upper limit defined in Conditional Formula (6), the combined positive refractive power of the second lens L2 and the third lens L3 can be secured, and a large amount of positive spherical aberration which is generated at the first lens L1 can be favorably corrected by the second lens L2 and the third lens L3. By Conditional Formula (6) being satisfied, the burden of correcting aberrations to be borne by the lenses positioned at the image side of the third lens L3 can be reduced, and a greater degree of freedom in the design of the imaging lens can be secured, resulting in favorable correction of aberrations becoming possible.

Conditional Formula (7) is a conditional formula for setting the refractive powers of the first lens L1 through the third lens L3 appropriately, and for enabling spherical aberration to be favorably corrected. By configuring the imaging lens such that the value of f1/f23 is not less than or equal to the lower limit defined in Conditional Formula (7), the negative refractive power of the first lens L1 can be prevented from becoming excessively weak with respect to the combined positive refractive power of the second lens L2 and the third lens L3. Therefore, the generation of negative spherical aberration can be suppressed. By configuring the imaging lens such that the value of f1/f23 is not greater than or equal to the upper limit defined in Conditional Formula (7), the combined positive refractive power of the second lens L2 and the third lens L3 can be prevented from becoming excessively weak with respect to the negative refractive power of the first lens L1. Therefore, the generation of positive spherical aberration can be suppressed. By Conditional Formula (7) being satisfied, the burden of correcting aberrations to be borne by the lenses positioned at the image side of the third lens L3 can be reduced. It is preferable for Conditional Formula (7-1) below to be satisfied, in order to obtain the above advantageous effects related to the lower limit of Conditional Formula (7) while causing the above advantageous effects related to the upper limit of Conditional Formula (7) to become more prominent.

$$-1<f1/f23<-0.6 \tag{7-1}$$

It is preferable for both of Conditional Formulae (6) and (7) to be satisfied. In this case, appropriately setting the refractive powers of the first lens L1 through the third lens L3 and favorably correcting spherical aberration will be facilitated further.

Conditional Formula (8) is a conditional formula for setting the refractive power of the third lens L3 appropriately and for enabling spherical aberration to be favorably corrected. By configuring the imaging lens such that the value of f3/f is not less than or equal to the lower limit defined in Conditional Formula (8), the refractive power of the third lens L3 can be suppressed, and negative spherical aberration can be suppressed. By configuring the imaging lens such that the value of f3/f is not greater than or equal to the upper limit defined in Conditional Formula (8), positive spherical aberration which is generated at the first lens L1 can be favorably corrected. By Conditional Formula (8) being satisfied, the burden of correcting aberrations to be borne by the lenses positioned at the image side of the third lens L3 can be reduced, and a greater degree of freedom in the design of the imaging lens can be secured, resulting in favorable correction of aberrations becoming possible.

Conditional Formula (9) is a conditional formula for setting the refractive powers of the second lens L2 and the third lens L3 appropriately and for enabling off axis comatic aberration to be favorably corrected. By configuring the imaging lens such that the value of f2/f3 is not less than or equal to the lower limit defined in Conditional Formula (9), the refractive power of the second lens L2 can be prevented from becoming excessively strong with respect to the refractive power of the third lens L3. As a result, the generation of higher order comatic aberration can be suppressed, particularly at the peripheral portion of the second lens L2, and favorable correction of aberrations will become possible. By configuring the imaging lens such that the value of f2/f3 is not greater than or equal to the upper limit defined in Conditional Formula (9), the refractive power of the second lens L2 can be prevented from becoming excessively weak with respect to the refractive power of the third lens L3. As a result, it will not become necessary to impart the third lens L3 with a stronger refractive power than necessary in order to correct a large amount of positive spherical aberration which is generated at the first lens L1. Therefore, favorable correction of aberrations will become possible, without higher order comatic aberration being generated, particularly by peripheral light rays. By Conditional Formula (9) being satisfied, the burden of correcting aberrations to be borne by the lenses positioned at the image side of the third lens L3 can be reduced, and a greater degree of freedom in the design of the imaging lens can be secured, resulting in favorable correction of aberrations becoming possible.

It is preferable for both of Conditional Formulae (8) and (9) to be satisfied. In this case, the refractive powers of the second lens L2 and the third lens L3 can be set appropriately, and favorable correction of spherical aberration and off axis comatic aberration is facilitated.

In addition, it is preferable for an aperture stop St that determines the F number of the lens system to be positioned between the surface of the third lens L3 toward the object side and the surface of the fourth lens L4 toward the object side. Note that the aperture stop St illustrated in FIG. 1 does not necessarily represent the size or shape thereof, but merely indicates the position of the aperture stop St along the optical axis Z.

It is preferable for the position of the aperture stop St in the direction of the optical axis to be at the object side of the surface of the fourth lens L4 toward the object side. In this case, the entrance pupil can be positioned more toward the object side, and achieving a widening of the angle of view will be facilitated. Meanwhile, it is preferable for the number of lenses positioned at the object side and at the image side of the aperture stop St to be substantially the same, from the viewpoint of correcting aberrations. In this case, aberrations related to the lower light rays of light beams at each angle of view can be effectively corrected by the group of lenses positioned at the object side of the aperture stop St, and aberrations related to the upper light rays of light beams at each angle of view can be effectively corrected by the group of lenses positioned at the image side of the aperture stop St. That is, effective correction will become possible in this separated manner, and therefore aberrations can be favorably corrected. For this reason, it is preferable for the position of the aperture stop St along the optical axis to be between the surface of the third lens L3 toward the object side and the surface of the fourth lens L4 toward the object side. This configuration enables aberrations to be favorably corrected and for a widening of the angle of view to be achieved.

Arbitrary combinations of the preferred configurations and the possible configurations described above are possible. It is preferable for the preferred configurations and possible configurations described above to be selectively adopted as appropriate, according to specifications required of the imaging lens. By adopting the configurations described above as appropriate, an imaging lens having a wide angle of view and high performance can be realized.

Note that here, a wide angle of view as referred to here means a maximum full angle of view of 100° or greater.

Next, examples of numerical values of the imaging lens of the present disclosure will be described.

EXAMPLE 1

FIG. 2 is a sectional diagram that illustrates the configuration of an imaging lens of Example 1. The imaging lens of Example 1 consists of seven lenses, which are the first lens L1 through the seventh lens L7. In FIG. 2, the left side is the object side, and the right side is the image side. FIG. 2 illustrates an example in which the aperture stop St and the optical member PP are provided.

Basic lens data are shown in Table 1 and aspherical surface coefficients are shown in Table 2 for the imaging lens of Example 1. In Table 1, surface numbers of ith surfaces (i=1, 2, 3, . . . ) that sequentially increase with the surface of the constituent element most toward the object side being designated as 1 are listed in the column Si.; the radii of curvature of each surface are listed in the column Ri; and distances along the optical axis Z between ith surfaces and i+1st surfaces are listed in the column Di. In addition, refractive indices with respect to the d line (wavelength: 587.6 nm) of jth (j=1, 2, 3, . . . ) constituent elements, with the constituent element most toward the object side being designated as 1, are listed in the column Ndj; and the Abbe's numbers with respect to the d line of jth constituent elements are listed in the column νdj.

Here, the signs of the radii of curvature are positive in cases that the surface shape is convex toward the object side, and negative in cases that the surface shape is convex toward the image side. Table 1 also shows data regarding the aperture stop St and the optical member PP. Text reading "(St)" is indicated along with a surface number in the column of the surface number at the surface corresponding to the aperture stop. The value in the lowermost row of the column Di is the distance between the surface most toward the image side within the table and the image formation plane Sim.

The focal length f of the entire lens system, the back focus Bf as an air converted length, the F number F No., and the maximum full angle of view 2ω with the d line as a reference are shown above the frame of Table 1.

In Table 1, the symbol "*" is appended to the surface numbers of aspherical surfaces, and numerical values that represent the paraxial radii of curvature are shown as the radii of curvature of the aspherical surfaces. Table 2 shows the aspherical surface coefficients related to the aspherical surfaces. "E-n" (n is an integer) in the numerical values for aspherical surface coefficients in Table 2 mean "·$10^{-n}$". The aspherical coefficients are the values of coefficients KA and Am (m=3, 4, 5, . . . , 11) in an aspherical surface formula represented by the formula below.

$$Zd = C \cdot h^2 / \{1 + (1 - KA \cdot C^2 \cdot h^2)^{1/2}\} + \Sigma Am \cdot h^m$$

wherein Zd is the depth of the aspherical surface (the length of a normal line from a point on the aspherical surface at a height h to a plane perpendicular to the optical axis in contact with the peak of the aspherical surface), h is height (the distance from the optical axis), C is the paraxial radius of curvature, and KA and Am (m=3, 4, 5, . . . , 11) are aspherical surface coefficients.

In each of the tables below, degrees are used as the units for angles and mm are used as the units for lengths. However, it is possible for optical systems to be proportionately enlarged or proportionately reduced and utilized.

Therefore, other appropriate units may be used. In addition, numerical values which are rounded off at a predetermined number of digits are shown in each of the tables below.

TABLE 1

Example 1
f = 2.83, Bf = 1.98, F No. = 1.98, 2ω = 138.0°

| Si | Ri | Di | Ndj | vdj |
|---|---|---|---|---|
| 1 | 23.2846 | 0.9000 | 1.77250 | 49.60 |
| 2 | 3.5806 | 2.6100 | | |
| 3 | 35.0539 | 1.4800 | 1.95906 | 17.47 |
| 4 | −35.0539 | 0.5400 | | |
| 5 | 44.0142 | 3.4400 | 1.71299 | 53.87 |
| 6 | −10.5392 | −0.0500 | | |
| 7 (St) | ∞ | 0.4100 | | |
| 8 | −8.3541 | 1.1500 | 1.95906 | 17.47 |
| 9 | 42.8789 | 0.5000 | | |
| *10 | −168.0982 | 2.9700 | 1.80610 | 40.93 |
| *11 | −5.0078 | 0.1500 | | |
| 12 | 5.7399 | 3.7700 | 1.61800 | 63.33 |
| 13 | −7.6932 | 0.8900 | | |
| 14 | −5.3637 | 0.8000 | 1.95906 | 17.47 |
| 15 | ∞ | 1.4148 | | |
| 16 | ∞ | 0.4000 | 1.51680 | 64.20 |
| 17 | ∞ | 0.3000 | | |

TABLE 2

Example 1

| | Surface Number | |
|---|---|---|
| | 10 | 11 |
| KA | 1.0000000E+00 | 1.0000000E+00 |
| A3 | 4.1670900E−03 | 6.1689303E−04 |
| A4 | −1.5196245E−02 | −1.7601027E−03 |
| A5 | 1.6449925E−02 | 1.3759985E−03 |
| A6 | −1.2189344E−02 | −8.2155764E−04 |
| A7 | 4.3176361E−03 | 1.2774993E−04 |
| A8 | −1.5001239E−03 | 2.5420082E−05 |
| A9 | 1.3947936E−03 | −7.5428252E−06 |
| A10 | −8.1138614E−04 | −1.6136884E−06 |
| A11 | 1.6292562E−04 | 4.0566928E−07 |

FIG. 9 and FIG. 10 are collections of diagrams that illustrate aberrations of the imaging lens of Example 1 in a state focused on an object at infinity. In FIG. 9, diagrams that illustrate spherical aberration, astigmatism, distortion, and lateral chromatic aberration (chromatic aberration of magnification) of the imaging lens of Example 1 are illustrated in this order from the left side of the drawing sheet. The diagram that illustrates spherical aberration show aberrations related to the d line (wavelength: 587.6 nm), the C line (wavelength: 656.3 nm), and the F line (wavelength: 486.1 nm), as a black solid line, a long broken line, and a short broken line, respectively. In the diagram that illustrates astigmatism, aberrations in the sagittal direction and aberrations in the tangential direction related to the d line are indicated by a solid line and a short broken line, respectively. In the diagram that illustrates distortion, aberrations related to the d line are shown as a solid line. In the diagram that illustrates lateral chromatic diagram, aberrations related to the C line and the F line are shown as a long broken line, and a short broken line, respectively. In the diagram that illustrates spherical aberration, "F No." denotes the F number. In the other diagrams that illustrate the aberrations, w denotes half angles of view.

In FIG. 10, diagrams that illustrate lateral aberration in the tangential direction are arranged at the left side of the drawing sheet, and diagrams that illustrate lateral aberration in the sagittal direction are arranged at the right side of the drawing sheet, for each of a plurality of half angles of view ω. The lateral aberration diagrams show aberrations related to the d line, the C line, and the F line as solid lines, long broken lines, and short broken lines, respectively. Note that the diagrams that illustrate aberrations of FIG. 9 and FIG. 10 are those for a case that three light shielding plates, which are a first through third light shielding plate (not shown) having circular openings with the centers thereof on the optical axis and that block a portion of peripheral light beams, are provided. The diameter of the opening of the first light shielding plate is 3.92 mm, and the first light shielding plate is positioned 0.44 mm toward the image side along the optical axis from the surface of the second lens L2 toward the image side. The diameter of the opening of the second light shielding plate is 2.88 mm, and the second light shielding plate is positioned 0.15 mm toward the image side along the optical axis from the surface of the fourth lens L4 toward the image side. The diameter of the opening of the third light shielding plate is 5.80 mm, and the third light shielding plate is positioned at the surface of the sixth lens L6 toward the object side.

The symbols, the meanings, and the manners in which the various pieces of data are described in the description of Example 1 above are the same for the examples to be described below unless otherwise noted. Therefore, redundant descriptions will be omitted hereinafter.

EXAMPLE 2

Figure 12:
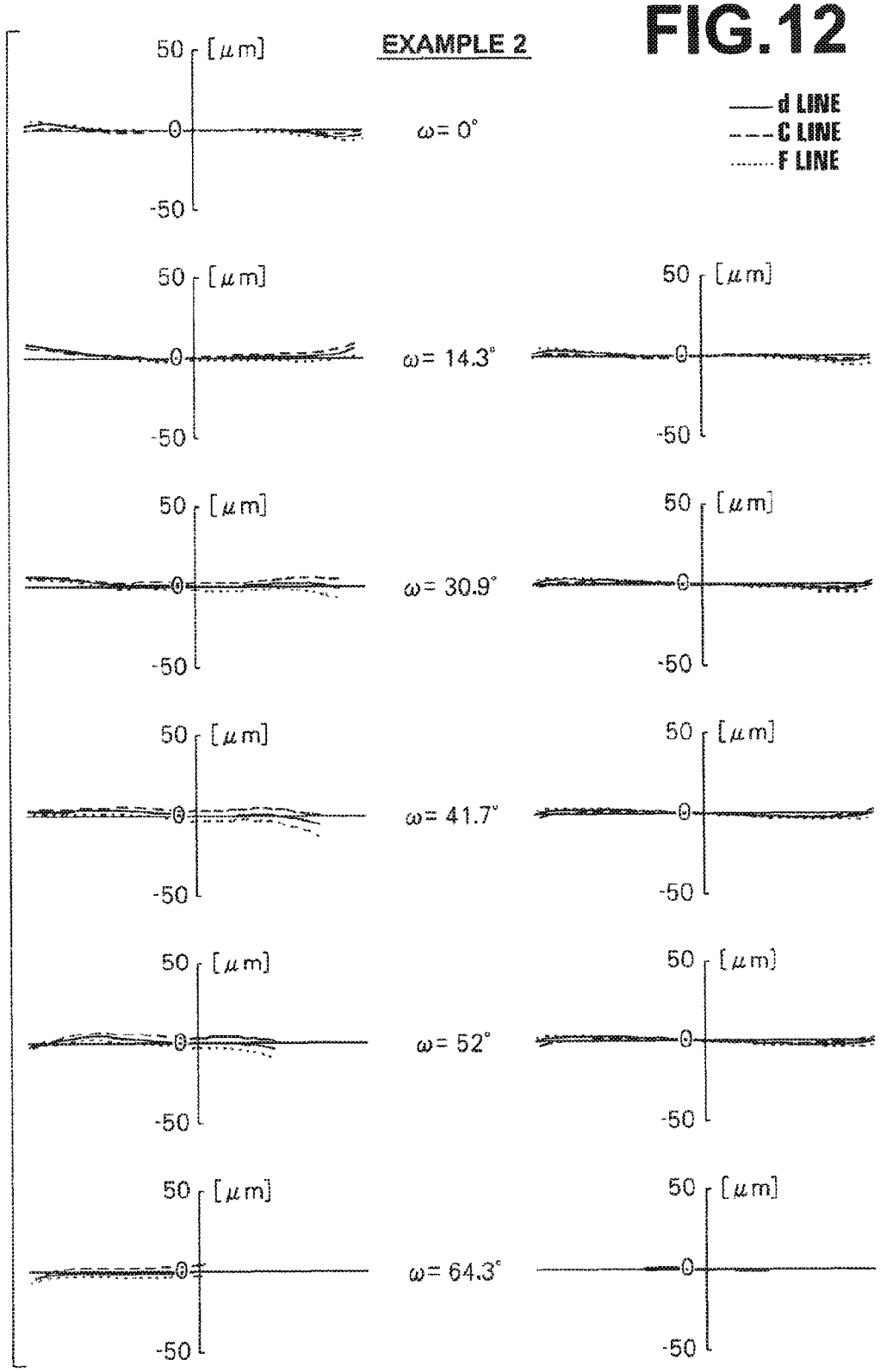
FIG. 12 is a collection of diagrams that illustrate lateral aberrations of the imaging lens of Example 2.

FIG. 3 is a cross sectional diagram that illustrates the lens configuration of an imaging lens of Example 2. Basic lens data for the imaging lens of Example 2 are shown in Table 3, and aspherical surface coefficients of the imaging lens of Example 2 are shown in Table 4. Diagrams that illustrate spherical aberration, astigmatism, distortion, and lateral chromatic aberration are arranged in this order from the left side of the drawing sheet of FIG. 11, and lateral aberration diagrams are illustrated in FIG. 12, as diagrams that illustrate the aberrations of the imaging lens of Example 2. The aberration diagrams are those for a case in which the imaging lens is focused on an object at infinity, and three light shielding plates are provided, in the same manner as Example 1. The diameter of the opening of the first light shielding plate is 3.92 mm, and the first light shielding plate is positioned 0.49 mm toward the image side along the optical axis from the surface of the second lens L2 toward the image side. The diameter of the opening of the second light shielding plate is 3.22 mm, and the second light shielding plate is positioned 0.26 mm toward the image side along the optical axis from the surface of the fourth lens L4 toward the image side. The diameter of the opening of the third light shielding plate is 5.92 mm, and the third light shielding plate is positioned at the surface of the sixth lens L6 toward the object side.

TABLE 3

Example 2
f = 3.40, Bf = 1.70, F No. = 1.98, 2ω = 128.6°

| Si | Ri | Di | Ndj | vdj |
|---|---|---|---|---|
| 1 | 29.8051 | 0.8900 | 1.77250 | 49.60 |
| 2 | 3.6466 | 2.8000 | | |
| 3 | 20.1911 | 1.8800 | 1.95906 | 17.47 |
| 4 | −20.1911 | 0.5900 | | |

TABLE 3-continued

Example 2
f = 3.40, Bf = 1.70, F No. = 1.98, 2ω = 128.6°

| Si | Ri | Di | Ndj | vdj |
|---|---|---|---|---|
| 5 | 70.2852 | 2.5400 | 1.75500 | 52.32 |
| 6 | −7.4778 | −0.0650 | | |
| 7 (St) | ∞ | 0.4000 | | |
| 8 | −6.6628 | 0.8000 | 1.95906 | 17.47 |
| 9 | 17.9478 | 0.6150 | | |
| *10 | −130.3315 | 2.9000 | 1.80610 | 40.93 |
| *11 | −5.6039 | 0.3800 | | |
| 12 | 5.8416 | 3.4000 | 1.61800 | 63.33 |
| 13 | −15.5255 | 1.8000 | | |
| 14 | −5.4343 | 1.0400 | 1.95906 | 17.47 |
| 15 | −15.0563 | 1.1320 | | |
| 16 | ∞ | 0.4000 | 1.51680 | 64.20 |
| 17 | ∞ | 0.3001 | | |

TABLE 4

Example 2

| | Surface Number | |
|---|---|---|
| | 10 | 11 |
| KA | 1.0000000E+00 | 1.0000000E+00 |
| A3 | 2.7342406E−03 | 1.4219633E−03 |
| A4 | −7.0495812E−03 | −1.9621860E−03 |
| A5 | 6.5596899E−03 | 1.1927854E−03 |
| A6 | −4.9972386E−03 | −6.5437782E−04 |
| A7 | 1.9475025E−03 | 1.5560150E−04 |
| A8 | −4.1777476E−04 | 1.3219287E−05 |
| A9 | 2.3569638E−04 | −1.0691312E−05 |
| A10 | −1.6651449E−04 | −1.3601172E−06 |
| A11 | 3.5311677E−05 | 5.2916660E−07 |

TABLE 5

Example 3
f = 2.98, Bf = 1.97, F No. = 1.81, 2ω = 138.0°

| Si | Ri | Di | Ndj | vdj |
|---|---|---|---|---|
| 1 | 99.7615 | 0.7500 | 1.77250 | 49.60 |
| 2 | 3.8131 | 3.3532 | | |
| 3 | 20.2374 | 1.7159 | 1.95906 | 17.47 |
| 4 | −22.9079 | 0.6577 | | |
| 5 | 214.5376 | 2.8270 | 1.69680 | 55.53 |
| 6 | −7.4290 | 0.1500 | | |
| 7 (St) | ∞ | 0.5000 | | |
| 8 | −6.1283 | 0.8500 | 1.95906 | 17.47 |
| 9 | 26.5296 | 0.4002 | | |
| *10 | −136.1837 | 2.1922 | 1.80610 | 40.93 |
| *11 | −5.1997 | 0.1100 | | |
| 12 | 6.1283 | 3.7129 | 1.62299 | 58.16 |
| 13 | −7.7491 | 1.3310 | | |
| 14 | −4.8529 | 0.7000 | 1.84666 | 23.78 |
| 15 | −22.7951 | 1.0060 | | |
| 16 | ∞ | 1.0000 | 1.51680 | 64.20 |
| 17 | ∞ | 0.3000 | | |

TABLE 6

Example 3

| | Surface Number | |
|---|---|---|
| | 10 | 11 |
| KA | 1.0000000E+00 | 1.0000000E+00 |
| A3 | 2.5903985E−03 | 1.6673551E−03 |
| A4 | −1.0552434E−02 | −4.6057934E−03 |
| A5 | 9.4244248E−03 | 4.1186081E−03 |
| A6 | −6.4904879E−03 | −2.3488634E−03 |
| A7 | 2.0006832E−03 | 4.1564402E−04 |
| A8 | −3.7284039E−04 | 1.0180210E−04 |
| A9 | 2.9666995E−04 | −2.9795017E−05 |
| A10 | −2.1270812E−04 | −1.2731743E−05 |
| A11 | 4.4707931E−05 | 3.4597527E−06 |

EXAMPLE 3

Figure 13:
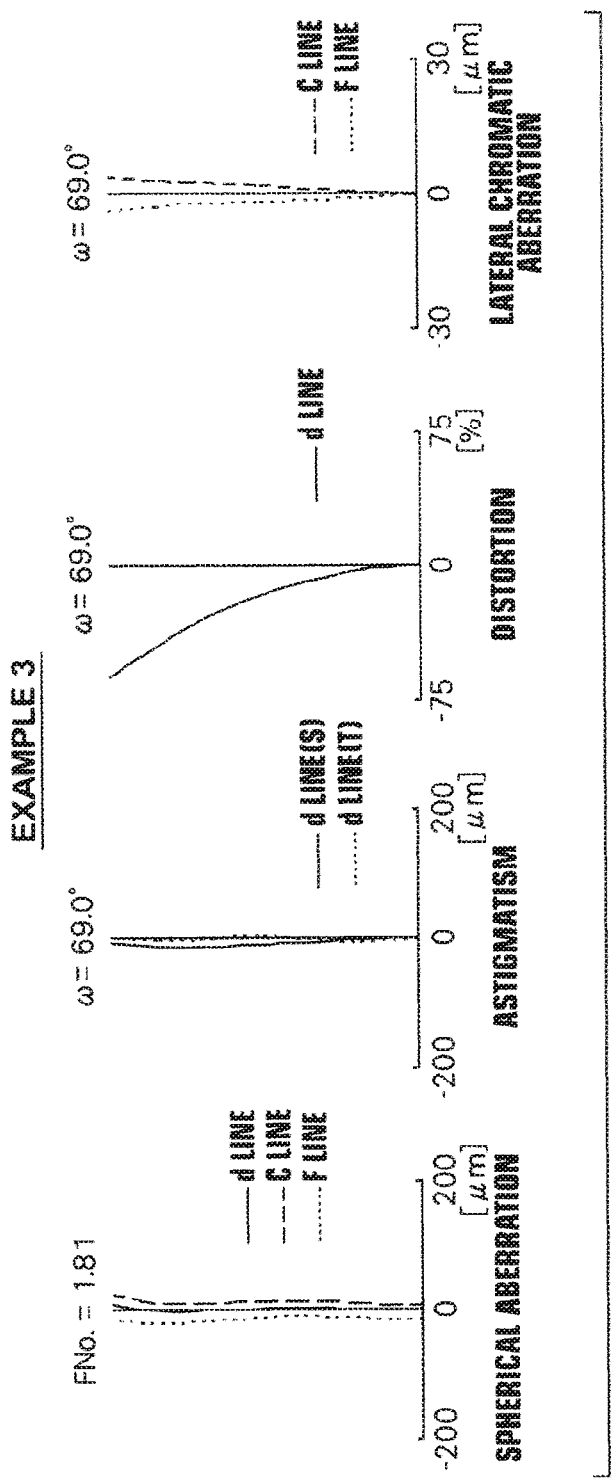
FIG. 13 is a collection of diagrams that illustrate various aberrations of the imaging lens of Example 3, which are spherical aberration, astigmatism, distortion, and lateral chromatic aberration in this order from the left side of the drawing sheet.
Figure 14:
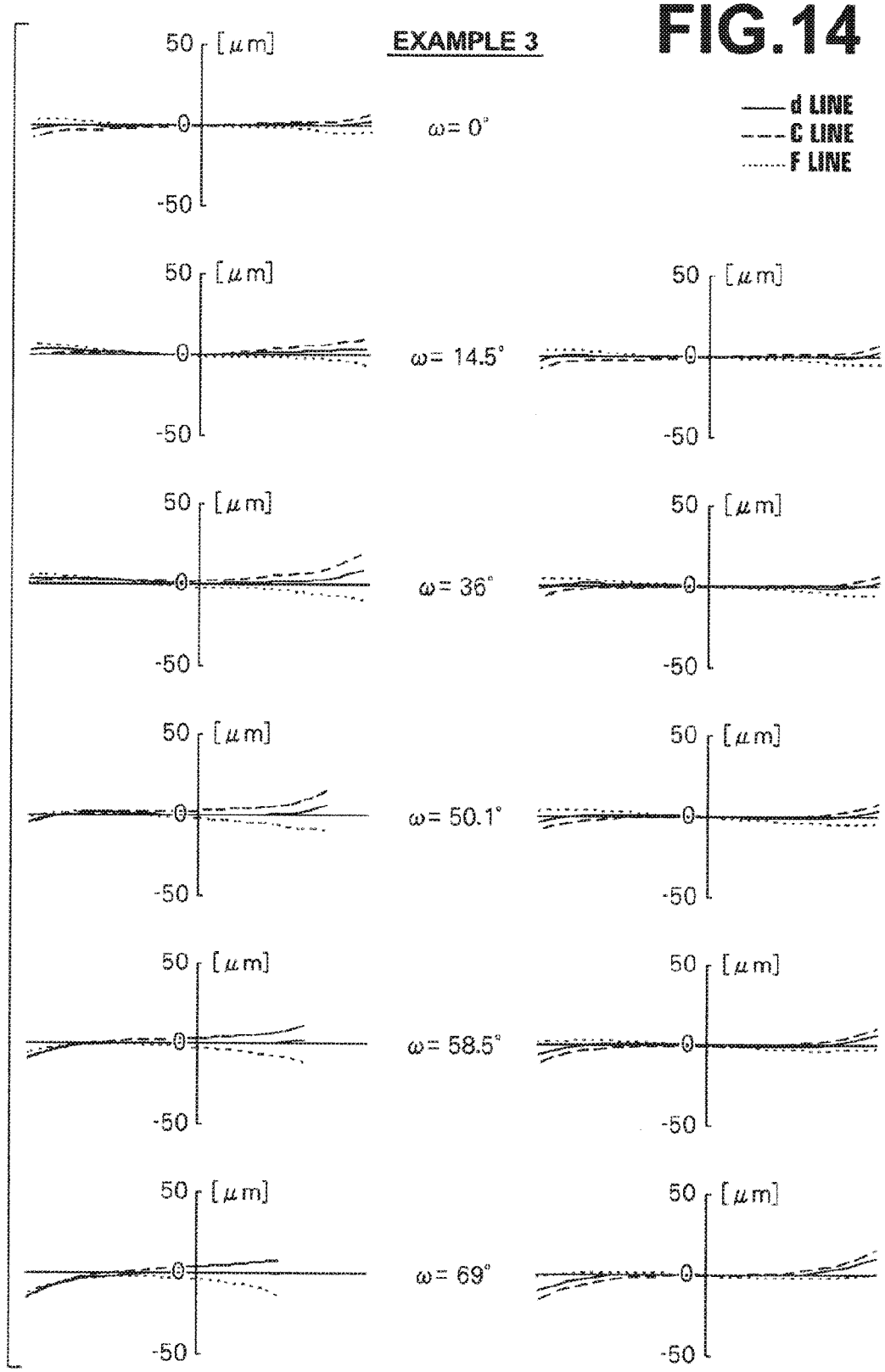
FIG. 14 is a collection of diagrams that illustrate lateral aberrations of the imaging lens of Example 3.

FIG. 4 is a cross sectional diagram that illustrates the lens configuration of an imaging lens of Example 3. Basic lens data for the imaging lens of Example 3 are shown in Table 5, and aspherical surface coefficients of the imaging lens of Example 3 are shown in Table 6. Diagrams that illustrate spherical aberration, astigmatism, distortion, and lateral chromatic aberration are arranged in this order from the left side of the drawing sheet of FIG. 13, and lateral aberration diagrams are illustrated in FIG. 14, as diagrams that illustrate the aberrations of the imaging lens of Example 3. The aberration diagrams are those for a case in which the imaging lens is focused on an object at infinity, and three light shielding plates are provided, in the same manner as Example 1. The diameter of the opening of the first light shielding plate is 4.50 mm, and the first light shielding plate is positioned 0.56 mm toward the image side along the optical axis from the surface of the second lens L2 toward the image side. The diameter of the opening of the second light shielding plate is 3.86 mm, and the second light shielding plate is positioned 0.20 mm toward the image side along the optical axis from the surface of the fourth lens L4 toward the image side. The diameter of the opening of the third light shielding plate is 5.80 mm, and the third light shielding plate is positioned at the surface of the sixth lens L6 toward the object side.

EXAMPLE 4

Figure 15:
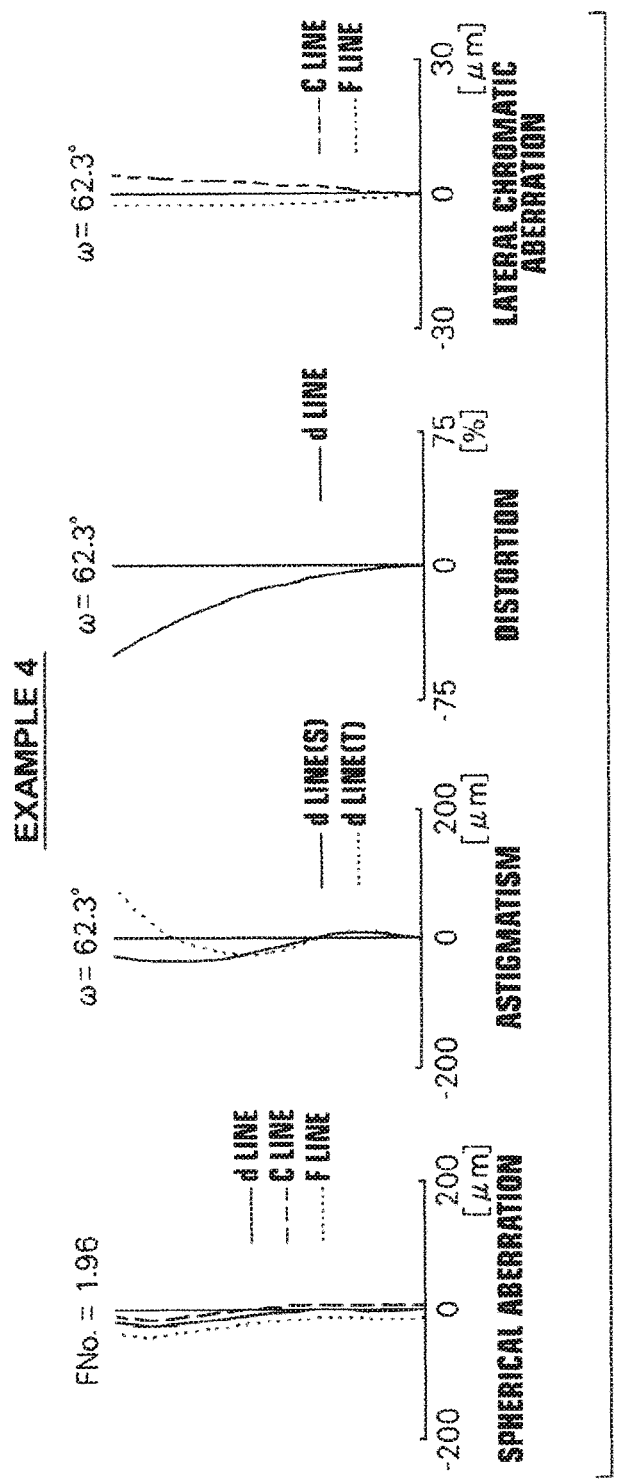
FIG. 15 is a collection of diagrams that illustrate various aberrations of the imaging lens of Example 4, which are spherical aberration, astigmatism, distortion, and lateral chromatic aberration in this order from the left side of the drawing sheet.
Figure 16:
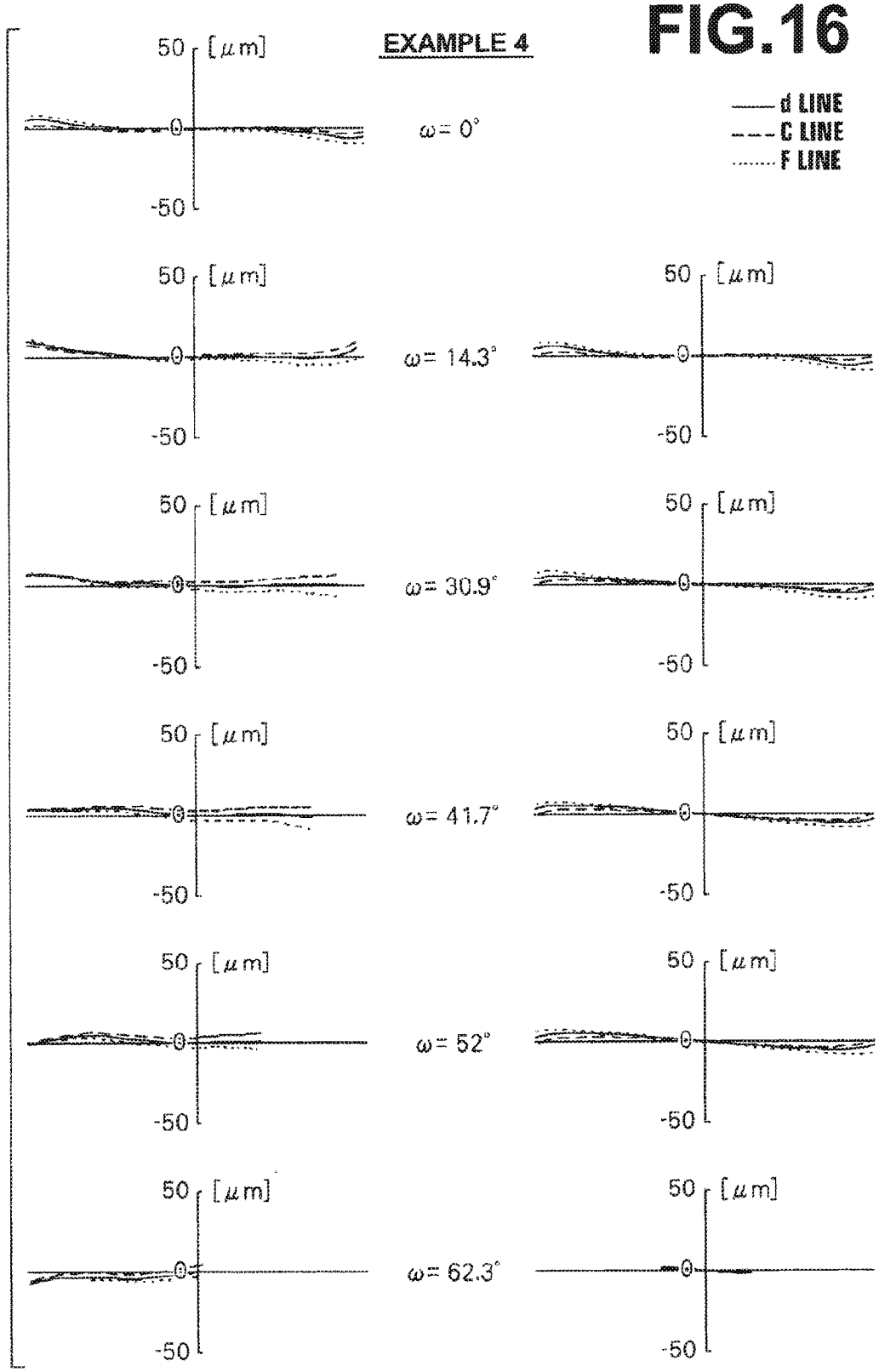
FIG. 16 is a collection of diagrams that illustrate lateral aberrations of the imaging lens of Example 4.

FIG. 5 is a cross sectional diagram that illustrates the lens configuration of an imaging lens of Example 4. Basic lens data for the imaging lens of Example 4 are shown in Table 7, and aspherical surface coefficients of the imaging lens of Example 4 are shown in Table 8. Diagrams that illustrate spherical aberration, astigmatism, distortion, and lateral chromatic aberration are arranged in this order from the left side of the drawing sheet of FIG. 15, and lateral aberration diagrams are illustrated in FIG. 16, as diagrams that illustrate the aberrations of the imaging lens of Example 4.

The aberration diagrams are those for a case in which the imaging lens is focused on an object at infinity, and three light shielding plates are provided, in the same manner as Example 1. The diameter of the opening of the first light shielding plate is 4.16 mm, and the first light shielding plate is positioned 0.45 mm toward the image side along the optical axis from the surface of the second lens L2 toward the image side. The diameter of the opening of the second light shielding plate is 3.24 mm, and the second light shielding plate is positioned 0.26 mm toward the image side along the optical axis from the surface of the fourth lens L4 toward the image side. The diameter of the opening of the third light shielding plate is 5.88 mm, and the third light shielding plate is positioned at the surface of the sixth lens L6 toward the object side.

TABLE 7

Example 4
f = 3.40, Bf = 1.66, F No. = 1.96, 2ω = 124.6°

| Si | Ri | Di | Ndj | νdj |
|---|---|---|---|---|
| 1 | 32.8076 | 0.8701 | 1.77250 | 49.60 |
| 2 | 3.6816 | 2.7626 | | |
| 3 | 19.6892 | 1.9233 | 1.95906 | 17.47 |
| 4 | −19.6892 | 0.5501 | | |
| 5 | 81.4676 | 2.4961 | 1.75500 | 52.32 |
| 6 | −7.4684 | −0.0499 | | |
| 7 (St) | ∞ | 0.4502 | | |
| 8 | −6.7488 | 0.7800 | 1.95906 | 17.47 |
| 9 | 18.1462 | 0.6157 | | |
| *10 | −137.5217 | 2.9412 | 1.80610 | 40.93 |
| *11 | −5.5706 | 0.5000 | | |
| 12 | 5.8894 | 3.4501 | 1.61800 | 63.33 |
| 13 | −15.9126 | 1.7246 | | |
| 14 | −5.5900 | 0.9976 | 1.95906 | 17.47 |
| 15 | −15.1475 | 1.0924 | | |
| 16 | ∞ | 0.4000 | 1.51680 | 64.20 |
| 17 | ∞ | 0.3001 | | |

TABLE 8

Example 4

| | Surface Number | |
|---|---|---|
| | 10 | 11 |
| KA | 1.0000000E+00 | 1.0000000E+00 |
| A3 | 2.8831052E−03 | 1.5391710E−03 |
| A4 | −7.1809426E−03 | −1.9822331E−03 |
| A5 | 6.7052838E−03 | 1.1596127E−03 |
| A6 | −5.1981745E−03 | −6.5185682E−04 |
| A7 | 2.0532315E−03 | 1.5973244E−04 |
| A8 | −4.3760618E−04 | 1.3147016E−05 |
| A9 | 2.4653023E−04 | −1.0955129E−05 |
| A10 | −1.7726863E−04 | −1.3564238E−06 |
| A11 | 3.7952181E−05 | 5.3489527E−07 |

TABLE 9

Example 5
f = 3.11, Bf = 1.82, F No. = 1.96, 2ω = 153.4°

| Si | Ri | Di | Ndj | νdj |
|---|---|---|---|---|
| 1 | 57.7833 | 0.8000 | 1.77250 | 49.60 |
| 2 | 3.7151 | 3.1899 | | |
| 3 | 21.3644 | 1.8698 | 1.95906 | 17.47 |
| 4 | −21.3644 | 0.5500 | | |
| 5 | 220.0266 | 2.3713 | 1.75500 | 52.32 |
| 6 | −7.7251 | −0.0499 | | |
| 7 (St) | ∞ | 0.5633 | | |
| 8 | −7.2439 | 0.8777 | 1.95906 | 17.47 |
| 9 | 17.5828 | 0.6134 | | |
| *10 | −130.5511 | 2.4601 | 1.80610 | 40.93 |
| *11 | −5.4359 | 0.1099 | | |
| 12 | 6.5358 | 3.6536 | 1.61800 | 63.33 |
| 13 | −9.0568 | 1.7160 | | |
| 14 | −4.9511 | 0.7299 | 1.95906 | 17.47 |
| 15 | −15.6548 | 0.4496 | | |
| 16 | ∞ | 1.6200 | 1.51680 | 64.20 |
| 17 | ∞ | 0.2999 | | |

TABLE 10

Example 5

| | Surface Number | |
|---|---|---|
| | 10 | 11 |
| KA | 1.0000000E+00 | 1.0000000E+00 |
| A3 | 1.4966160E−03 | 9.7795278E−04 |
| A4 | −8.7668176E−03 | −3.6607876E−03 |
| A5 | 8.7574827E−03 | 3.3265545E−03 |
| A6 | −6.3226276E−03 | −1.9488205E−03 |
| A7 | 1.8368227E−03 | 3.6649820E−04 |
| A8 | −3.3370826E−04 | 7.0645874E−05 |
| A9 | 3.0782785E−04 | −2.4195792E−05 |
| A10 | −2.0306272E−04 | −8.3116393E−06 |
| A11 | 3.8711819E−05 | 2.2582359E−06 |

EXAMPLE 5

Figure 17:
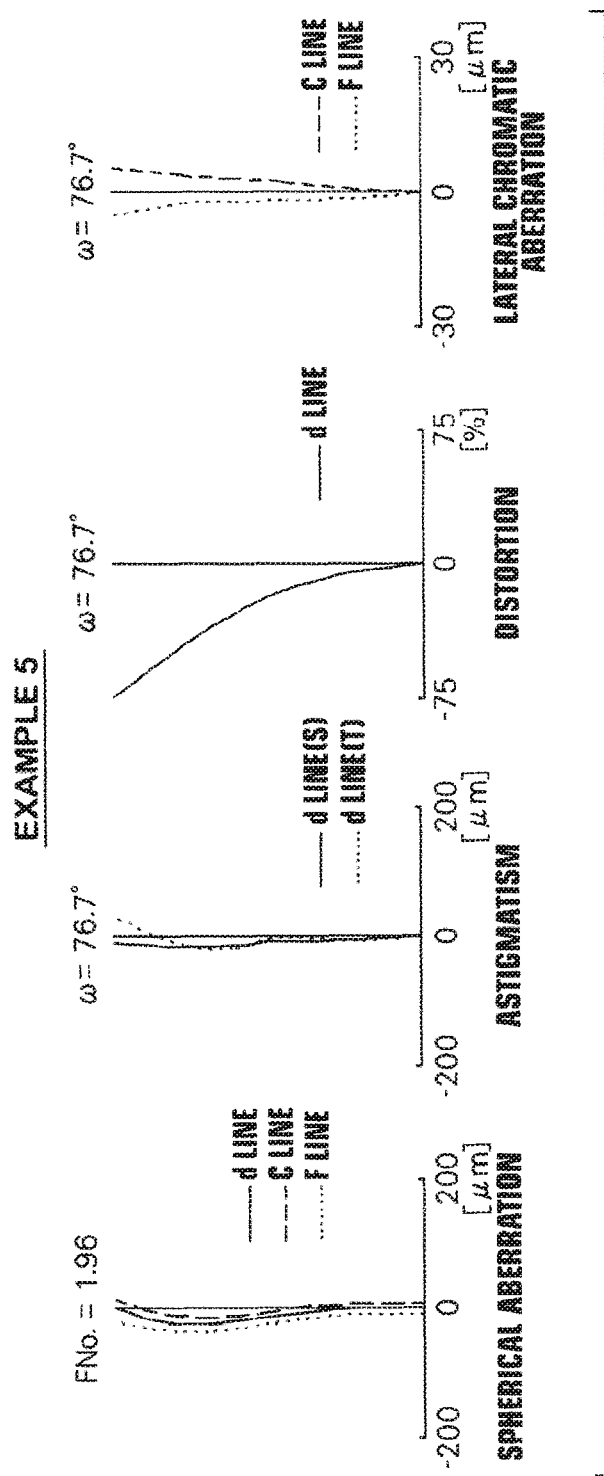
FIG. 17 is a collection of diagrams that illustrate various aberrations of the imaging lens of Example 5, which are spherical aberration, astigmatism, distortion, and lateral chromatic aberration in this order from the left side of the drawing sheet.
Figure 18:
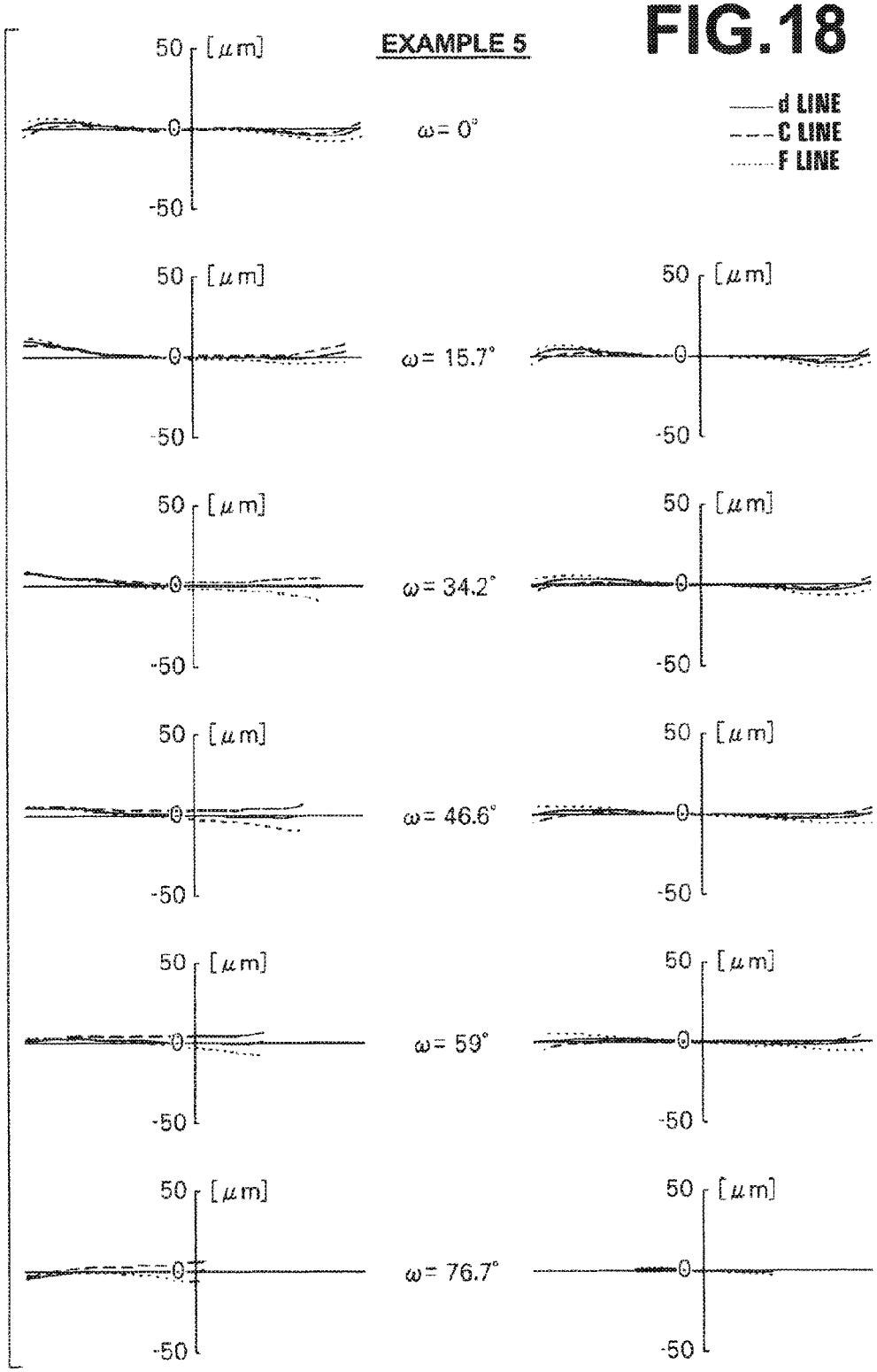
FIG. 18 is a collection of diagrams that illustrate lateral aberrations of the imaging lens of Example 5.

FIG. 6 is a cross sectional diagram that illustrates the lens configuration of an imaging lens of Example 5. Basic lens data for the imaging lens of Example 5 are shown in Table 9, and aspherical surface coefficients of the imaging lens of Example 5 are shown in Table 10. Diagrams that illustrate spherical aberration, astigmatism, distortion, and lateral chromatic aberration are arranged in this order from the left side of the drawing sheet of FIG. 17, and lateral aberration diagrams are illustrated in FIG. 18, as diagrams that illustrate the aberrations of the imaging lens of Example 5. The aberration diagrams are those for a case in which the imaging lens is focused on an object at infinity, and three light shielding plates are provided, in the same manner as Example 1. The diameter of the opening of the first light shielding plate is 4.40 mm, and the first light shielding plate is positioned 0.45 mm toward the image side along the optical axis from the surface of the second lens L2 toward the image side. The diameter of the opening of the second light shielding plate is 3.24 mm, and the second light shielding plate is positioned 0.40 mm toward the image side along the optical axis from the surface of the fourth lens L4 toward the image side. The diameter of the opening of the third light shielding plate is 5.62 mm, and the third light shielding plate is positioned at the surface of the sixth lens L6 toward the object side.

EXAMPLE 6

Figure 19:
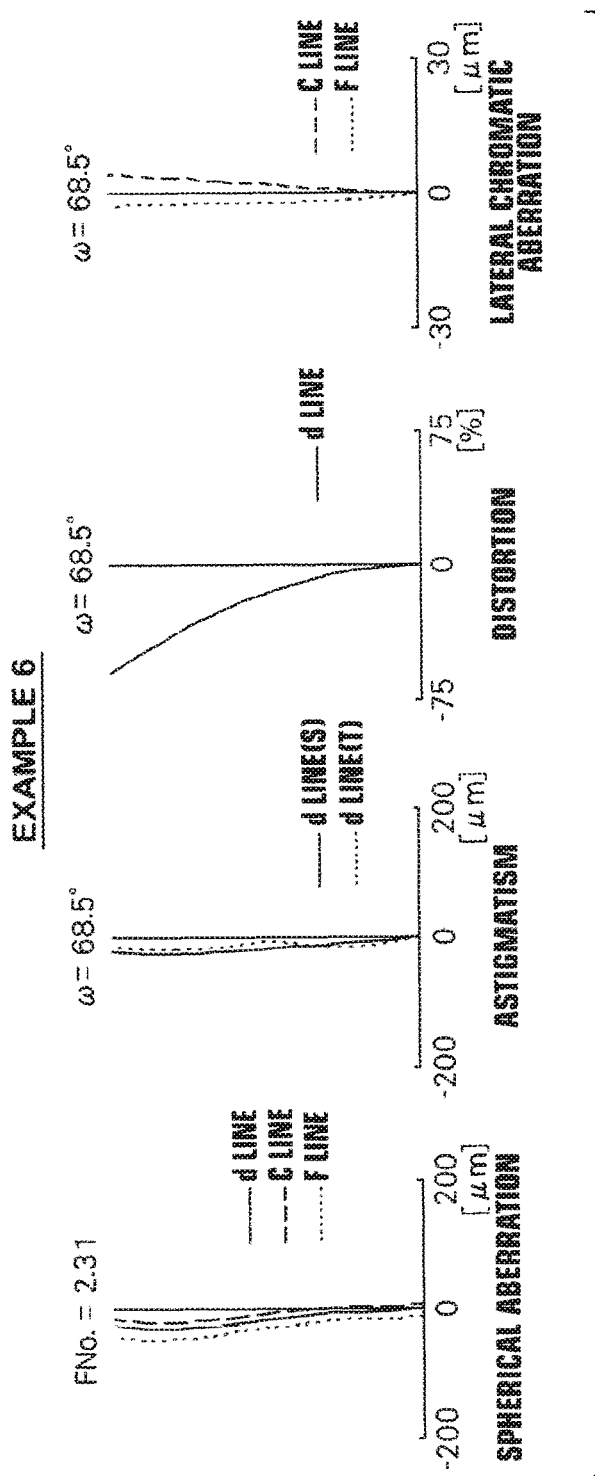
FIG. 19 is a collection of diagrams that illustrate various aberrations of the imaging lens of Example 6, which are spherical aberration, astigmatism, distortion, and lateral chromatic aberration in this order from the left side of the drawing sheet.
Figure 20:
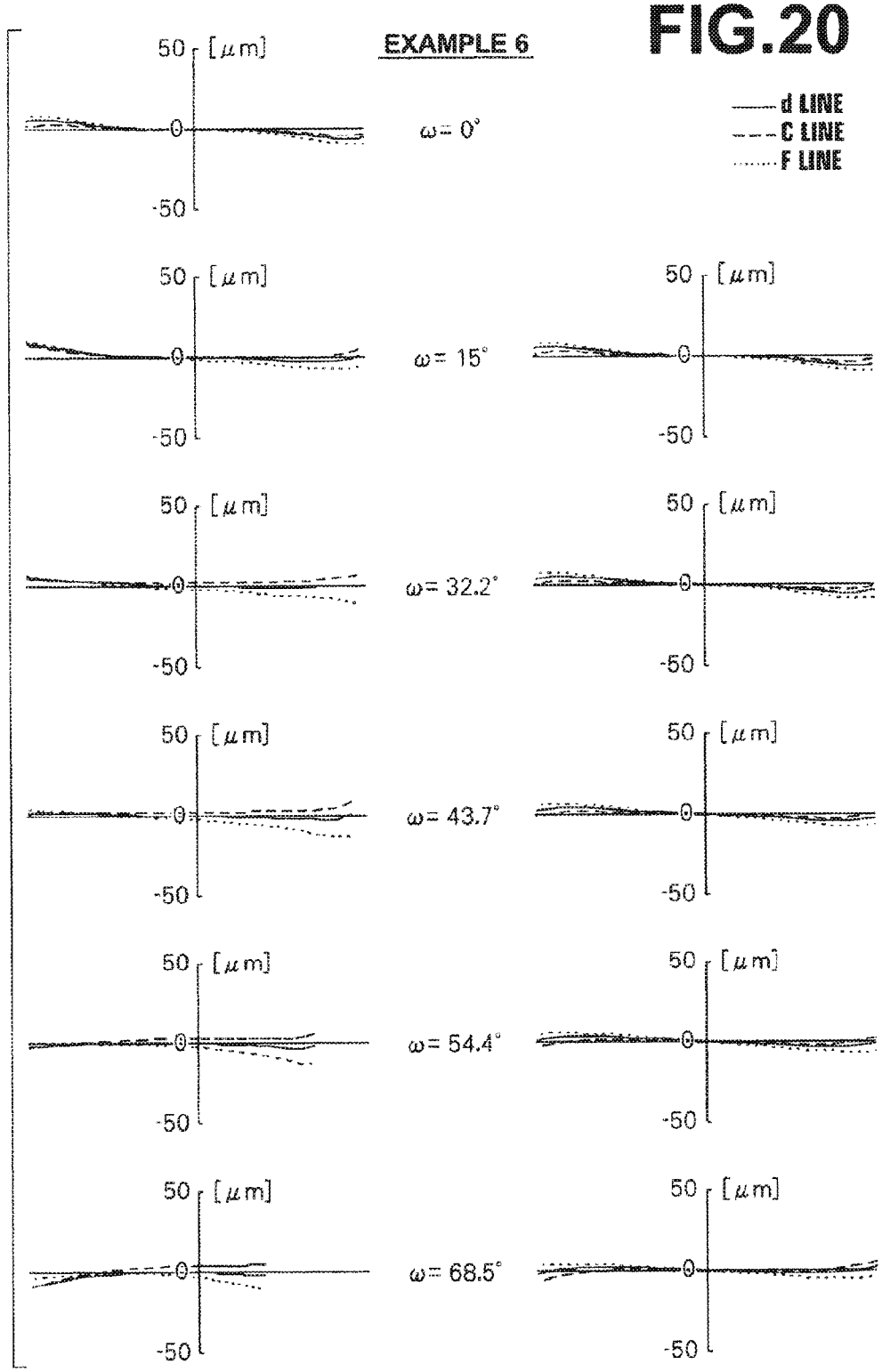
FIG. 20 is a collection of diagrams that illustrate lateral aberrations of the imaging lens of Example 6.

FIG. 7 is a cross sectional diagram that illustrates the lens configuration of an imaging lens of Example 6. Basic lens data for the imaging lens of Example 6 are shown in Table 11, and aspherical surface coefficients of the imaging lens of Example 6 are shown in Table 12. Diagrams that illustrate spherical aberration, astigmatism, distortion, and lateral chromatic aberration are arranged in this order from the left side of the drawing sheet of FIG. 19, and lateral aberration diagrams are illustrated in FIG. 20, as diagrams that illustrate the aberrations of the imaging lens of Example 6. The aberration diagrams are those for a case in which the imaging lens is focused on an object at infinity, and three light shielding plates are provided, in the same manner as Example 1. The diameter of the opening of the first light shielding plate is 3.96 mm, and the first light shielding plate is positioned 0.45 mm toward the image side along the optical axis from the surface of the second lens L2 toward the image side. The diameter of the opening of the second light shielding plate is 3.42 mm, and the second light shielding plate is positioned 0.30 mm toward the image side along the optical axis from the surface of the fourth lens L4 toward the image side. The diameter of the opening of the third light shielding plate is 5.76 mm, and the third light shielding plate is positioned at the surface of the sixth lens L6 toward the object side. Note that the data for Example 6 are for an example in which the optical member PP is not included.

TABLE 11

Example 6
f = 3.08, Bf = 1.82, F No. = 2.31, 2ω = 137.0°

| Si | Ri | Di | Ndj | vdj |
|---|---|---|---|---|
| 1 | 68.8558 | 0.7800 | 1.77250 | 49.60 |
| 2 | 3.8087 | 3.3814 | | |
| 3 | 23.7653 | 1.7760 | 1.95906 | 17.47 |
| 4 | −21.4490 | 0.5499 | | |
| 5 | 207.8331 | 2.4023 | 1.75500 | 52.32 |
| 6 | −7.6782 | 0.1500 | | |
| 7 (St) | ∞ | 0.4657 | | |
| 8 | −6.3146 | 0.8783 | 1.95906 | 17.47 |
| 9 | 28.2066 | 0.5677 | | |
| *10 | −136.2051 | 2.5977 | 1.80610 | 40.93 |
| *11 | −5.2946 | 0.1717 | | |
| 12 | 7.4569 | 3.6500 | 1.61800 | 63.33 |
| 13 | −8.2615 | 1.7160 | | |
| 14 | −5.2432 | 0.9001 | 1.95906 | 17.47 |
| 15 | −17.1677 | 1.8187 | | |

TABLE 12

Example 6

| | Surface Number | |
|---|---|---|
| | 10 | 11 |
| KA | 1.0000000E+00 | 1.0000000E+00 |
| A3 | 1.5989280E−03 | 8.4588071E−04 |
| A4 | −8.9298886E−03 | −3.1804614E−03 |
| A5 | 8.7157162E−03 | 2.8686715E−03 |
| A6 | −6.3578010E−03 | −1.6330592E−03 |
| A7 | 1.8591760E−03 | 3.0027135E−04 |
| A8 | −3.2869423E−04 | 5.5053200E−05 |
| A9 | 3.0763949E−04 | −1.9054416E−05 |
| A10 | −2.0452576E−04 | −6.1129327E−06 |
| A11 | 3.9003095E−05 | 1.6540106E−06 |

EXAMPLE 7

Figure 21:
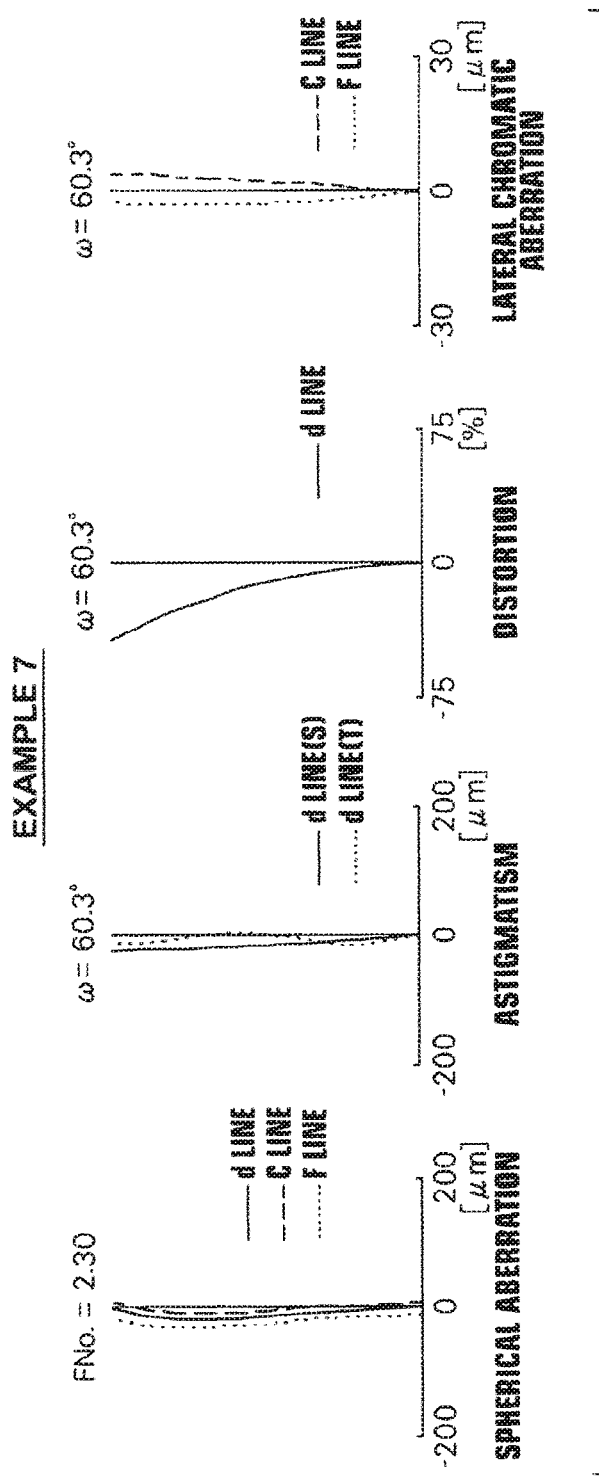
FIG. 21 is a collection of diagrams that illustrate various aberrations of the imaging lens of Example 7, which are spherical aberration, astigmatism, distortion, and lateral chromatic aberration in this order from the left side of the drawing sheet.
Figure 22:
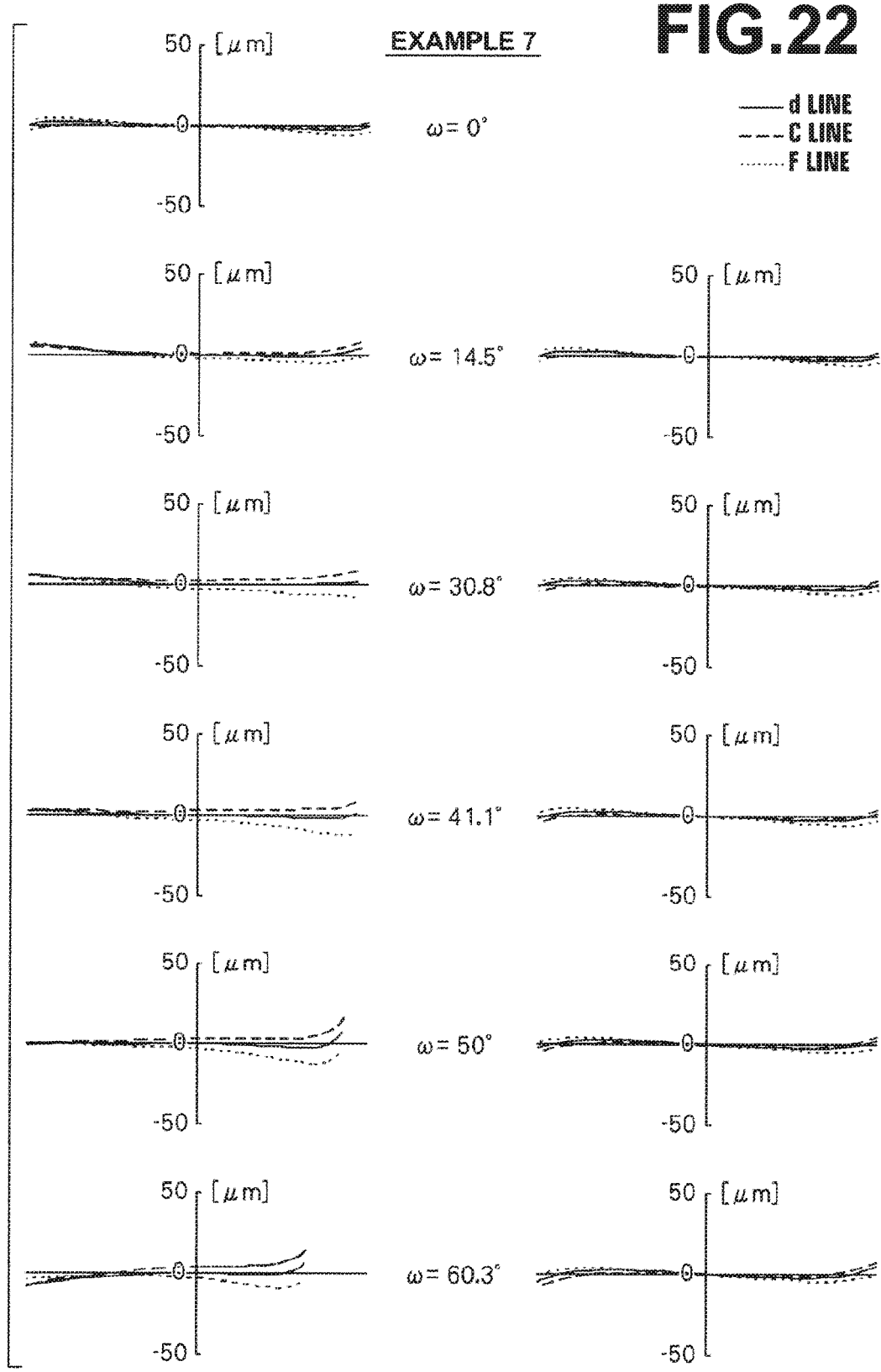
FIG. 22 is a collection of diagrams that illustrate lateral aberrations of the imaging lens of Example 7.

FIG. 8 is a cross sectional diagram that illustrates the lens configuration of an imaging lens of Example 7. Basic lens data for the imaging lens of Example 7 are shown in Table 13, and aspherical surface coefficients of the imaging lens of Example 7 are shown in Table 14. Diagrams that illustrate spherical aberration, astigmatism, distortion, and lateral chromatic aberration are arranged in this order from the left side of the drawing sheet of FIG. 21, and lateral aberration diagrams are illustrated in FIG. 22, as diagrams that illustrate the aberrations of the imaging lens of Example 7. The aberration diagrams are those for a case in which the imaging lens is focused on an object at infinity, and three light shielding plates are provided, in the same manner as Example 1. The diameter of the opening of the first light shielding plate is 4.20 mm, and the first light shielding plate is positioned 0.45 mm toward the image side along the optical axis from the surface of the second lens L2 toward the image side. The diameter of the opening of the second light shielding plate is 3.38 mm, and the second light shielding plate is positioned 0.20 mm toward the image side along the optical axis from the surface of the fourth lens L4 toward the image side. The diameter of the opening of the third light shielding plate is 5.74 mm, and the third light shielding plate is positioned at the surface of the sixth lens L6 toward the object side. Note that the data for Example 7 are for an example in which the optical member PP is not included.

TABLE 13

Example 7
f = 3.18, Bf = 1.24, F No. = 2.30, 2ω = 120.6°

| Si | Ri | Di | Ndj | vdj |
|---|---|---|---|---|
| 1 | 34.0927 | 0.8001 | 1.77250 | 49.60 |
| 2 | 3.7963 | 3.4313 | | |
| 3 | 26.6602 | 1.7765 | 1.95906 | 17.47 |
| 4 | −21.4485 | 0.5499 | | |
| 5 | 111.3638 | 2.4300 | 1.75500 | 52.32 |
| 6 | −7.6552 | −0.0001 | | |
| 7 (St) | ∞ | 0.4500 | | |
| 8 | −6.4709 | 0.7801 | 1.95906 | 17.47 |
| 9 | 34.3187 | 0.4353 | | |
| *10 | −133.0608 | 2.5054 | 1.80610 | 40.93 |
| *11 | −5.2152 | 0.1103 | | |
| 12 | 8.0378 | 4.3211 | 1.61800 | 63.33 |
| 13 | −7.7129 | 1.7160 | | |
| 14 | −4.7664 | 1.0000 | 1.95906 | 17.47 |
| 15 | −20.1453 | 1.2391 | | |

TABLE 14

Example 7

| | Surface Number | |
|---|---|---|
| | 10 | 11 |
| KA | 1.0000000E+00 | 1.0000000E+00 |
| A3 | 1.5626409E−03 | 7.8634808E−04 |
| A4 | −8.7944243E−03 | −3.1463332E−03 |
| A5 | 8.7496317E−03 | 3.0511927E−03 |
| A6 | −6.4157179E−03 | −1.7517304E−03 |
| A7 | 1.8458404E−03 | 3.1403495E−04 |
| A8 | −3.1824036E−04 | 6.0022067E−05 |
| A9 | 3.0943634E−04 | −2.0163278E−05 |
| A10 | −2.0505868E−04 | −6.7082195E−06 |
| A11 | 3.8881395E−05 | 1.8212528E−06 |

Table 15 shows the values corresponding to Conditional Formulae (1) through (9) for the imaging lenses of Examples 1 through 7 with the d line as a reference.

TABLE 15

| Formula Number | | Example 1 | Example 2 | Example 3 | Example 4 | Example 5 | Example 6 | Example 7 |
|---|---|---|---|---|---|---|---|---|
| (1) | R2/f | 1.264 | 1.072 | 1.280 | 1.082 | 1.195 | 1.238 | 1.196 |
| (2) | R3/f | 12.38 | 5.93 | 6.79 | 5.79 | 6.87 | 7.73 | 8.40 |
| (3) | D4/f | 0.191 | 0.173 | 0.221 | 0.162 | 0.177 | 0.179 | 0.173 |
| (4) | f1/f | −1.974 | −1.604 | −1.728 | −1.599 | −1.664 | −1.705 | −1.762 |
| (5) | f2/f | 6.521 | 3.165 | 3.834 | 3.091 | 3.662 | 3.896 | 3.975 |
| (6) | f23/f | 2.839 | 1.648 | 2.087 | 1.637 | 1.918 | 1.966 | 1.910 |
| (7) | f1/f23 | −0.695 | −0.974 | −0.828 | −0.976 | −0.868 | −0.867 | −0.923 |
| (8) | f3/f | 4.325 | 2.668 | 3.476 | 2.696 | 3.195 | 3.203 | 3.014 |
| (9) | f2/f3 | 1.508 | 1.186 | 1.103 | 1.147 | 1.146 | 1.216 | 1.319 |

As can be understood from the above data, the imaging lenses of Examples 1 through 7 are lens systems having a seven lens configuration that achieve wide angles of view with maximum angles of view within a range from 120° to 155°, of which the sizes in the radial direction are configured to be comparatively compact, have small F numbers within a range from 1.8 to 2.35, that favorably correct various aberrations and achieve high optical performance.

Figure 23:
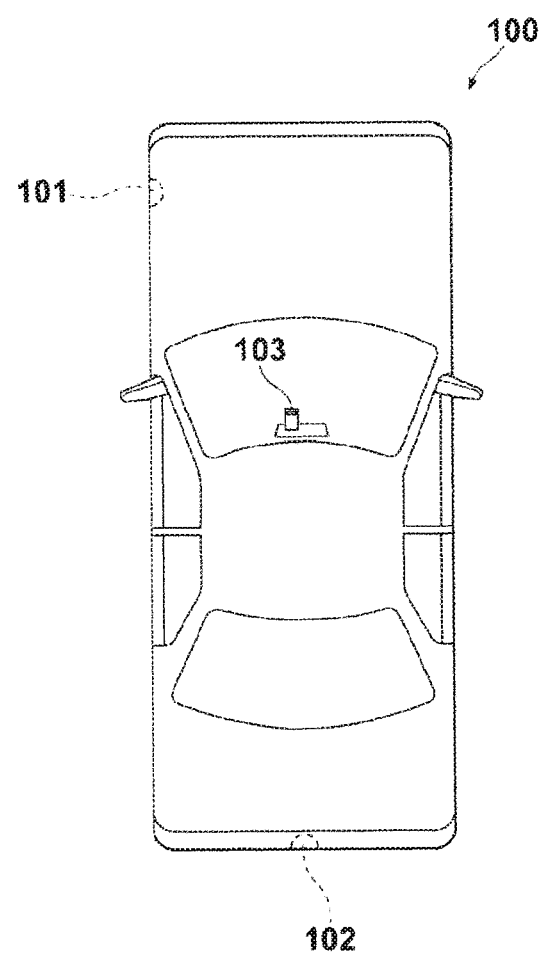
FIG. 23 is a diagram that schematically illustrates the arrangement of a vehicle mounted imaging apparatus according to an embodiment of the present disclosure.

FIG. 23 illustrates the manner in which imaging apparatuses equipped with imaging lenses according to an embodiment of the present disclosure are mounted on an automobile 100 as an example of utilization. In FIG. 23, the automobile 100 is equipped with an externally mounted camera 101 for imaging a blind spot range at the side surface on the side of the passenger seat, an externally mounted camera 102 for imaging a blind spot range at the rear side of the automobile 100, and a internally mounted camera which is mounted on the back surface of the rear view mirror and images the same range as the field of view of a driver. The externally mounted camera 101, the externally mounted camera 102, and the internally mounted camera 103 are imaging apparatuses according to an embodiment of the present disclosure, and are equipped with imaging lenses according to an embodiment of the present disclosure and imaging elements that convert optical images formed by the imaging lenses into electrical signals.

The imaging lens of the present disclosure has the advantages described above. Therefore, the externally mounted camera 101, the externally mounted camera 102, and the internally mounted camera 103 have wide angles of view and are capable of obtaining favorable images.

The present disclosure has been described with reference to the embodiments and Examples. However, the present disclosure is not limited to the above embodiments and Examples, and various modifications are possible. For example, the numerical values of the radii of curvature, the surface distances, the refractive indices, the Abbe's numbers, the aspherical surface coefficients, etc. of the lens components are not limited to those exemplified in the above Examples, and may be different values.

In addition, an example in which the present disclosure was applied to vehicle mounted cameras was described with reference to a drawing as embodiments of the imaging apparatus. However, the present disclosure is not limited to this use, and may also be applied to a camera for a portable terminal, a surveillance camera, etc.

What is claimed is:

1. An imaging lens consisting of seven lenses, which are, in order from the object side to the image side:
  a first lens having a negative refractive power;
  a second lens having a positive refractive power;
  a third lens having a positive refractive power;
  a fourth lens having a negative refractive power;
  a fifth lens having a positive refractive power;
  a sixth lens having a positive refractive power; and
  a seventh lens having a negative refractive power; and
  Conditional Formulae (1) and (2) below being satisfied:

$$1<R2/f \tag{1}$$

$$4<R3/f<30 \tag{2}$$

wherein R2 is the radius of curvature of the surface of the first lens toward the image side, f is the focal length of the entire lens system, and R3 is the radius of curvature of the surface of the second lens toward the object side.

2. An imaging lens as defined in claim 1, in which Conditional Formula (4) below is satisfied:

$$-2<f1/f<-1.5 \tag{4}$$

wherein f1 is the focal length of the first lens.

3. An imaging lens as defined in claim 1, in which Conditional Formula (6) below is satisfied:

$$1.5<f23/f<3 \tag{6}$$

wherein f23 is the combined focal length of the second lens and the third lens.

4. An imaging lens as defined in claim 1, in which Conditional Formula (8) below is satisfied:

$$2.5<f3/f<4.5 \tag{8}$$

wherein f3 is the focal length of the third lens.

5. An imaging lens as defined in claim 1, in which Conditional Formula (9) below is satisfied:

$$1<f2/f3<1.55 \tag{9}$$

wherein f2 is the focal length of the second lens, and f3 is the focal length of the third lens.

6. An imaging lens as defined in claim 1, wherein:
  an aperture stop is positioned between the surface of the third lens toward the object side and the surface of the fourth lens toward the object side.

7. An imaging lens as defined in claim 1, in which Conditional Formula (1-1) below is satisfied:

$$1<R2/f<3 \tag{1-1}$$

8. An imaging lens as defined in claim 1, in which Conditional Formula (2-1) below is satisfied:

$$4<R3/f<15 \tag{2-1}$$

9. An imaging apparatus equipped with an imaging lens as defined in claim 1.

10. An imaging lens as defined in claim 1, in which Conditional Formula (3) below is satisfied:

$$D4/f<0.39 \tag{3}$$

wherein D4 is the distance along the optical axis between the second lens and the third lens.

11. An imaging lens as defined in claim 10, in which Conditional Formula (3-1) below is satisfied:

$$0.1<D4/f<0.39 \tag{3-1}$$

12. An imaging lens as defined in claim 10, in which Conditional Formula (3-2) below is satisfied:

$$0.15<D4/f<0.39 \tag{3-2}$$

13. An imaging lens as defined in claim 1, in which Conditional Formula (5) below is satisfied:

$$2.5<f2/f \tag{5}$$

wherein f2 is the focal length of the second lens.

14. An imaging lens as defined in claim 13, in which Conditional Formula (5-1) below is satisfied:

$$3<f2/f<7 \tag{5-1}$$

15. An imaging lens as defined in claim 1, in which Conditional Formula (7) below is satisfied:

$$-1<f1/f23<-0.4 \tag{7}$$

wherein f1 is the focal length of the first lens, and f23 is the combined focal length of the second lens and the third lens.

16. An imaging lens as defined in claim 15, in which Conditional Formula (7-1) below is satisfied:

$$-1<f1/f23<-0.6 \tag{7-1}$$

* * * * *